US00RE39951E

(19) United States
(12) Reissued Patent
Itoh et al.

(10) Patent Number: US RE39,951 E
(45) Date of Reissued Patent: Dec. 25, 2007

(54) POLARIZATION CONVERSION ELEMENT, POLARIZATION ILLUMINATOR, DISPLAY USING THE SAME ILLUMINATOR, AND PROJECTOR

(75) Inventors: Yoshitaka Itoh, Suwa (JP); Toshiaki Hashizume, Suwa (JP)

(73) Assignee: Seiko Epson Corporation, Tokyo (JP)

(21) Appl. No.: 09/987,953

(22) PCT Filed: Jun. 25, 1997

(86) PCT No.: PCT/JP97/02189

§ 371 (c)(1),
(2), (4) Date: Feb. 20, 1998

(87) PCT Pub. No.: WO97/50012

PCT Pub. Date: Dec. 31, 1997

Related U.S. Patent Documents

Reissue of:
(64) Patent No.: 5,986,809
Issued: Nov. 16, 1999
Appl. No.: 09/029,080
Filed: Feb. 20, 1998

(30) Foreign Application Priority Data

Jun. 25, 1996 (JP) ..... 8-165006

(51) Int. Cl.
*G02B 27/10* (2006.01)
*G02B 5/30* (2006.01)

(52) U.S. Cl. ..... 359/618; 359/495; 359/497

(58) Field of Classification Search ..... 359/618, 359/619, 495, 497, 487, 250, 253, 256; 353/20, 353/31, 97

See application file for complete search history.

(56) References Cited

U.S. PATENT DOCUMENTS

| | | | | |
|---|---|---|---|---|
| 2,748,659 A | | 6/1956 | Geffcken et al. | 359/487 |
| 3,788,740 A | | 1/1974 | Shogren | 355/51 |
| 4,560,999 A | | 12/1985 | Tokuhara | 347/136 |
| 5,164,854 A | | 11/1992 | Takanashi et al. | 359/256 |
| 5,184,248 A | | 2/1993 | de Vaan et al. | |
| 5,387,991 A | | 2/1995 | Mitsutake et al. | 359/93 |
| 5,528,720 A | | 6/1996 | Winston et al. | 385/146 |
| 5,555,186 A | | 9/1996 | Shioya | 349/9 |
| 5,566,367 A | | 10/1996 | Mitsutake et al. | 359/497 |
| 5,751,480 A | | 5/1998 | Kitagishi | 359/485 |
| 5,978,136 A | | 11/1999 | Ogawa et al. | 359/487 |
| 6,154,320 A | * | 11/2000 | Itoh et al. | 359/629 |

FOREIGN PATENT DOCUMENTS

| | | |
|---|---|---|
| JP | 59-127019 | 7/1984 |
| JP | A-61-90584 | 5/1986 |
| JP | A-3-256025 | 11/1991 |
| JP | 04-230705 | 8/1992 |
| JP | A-5-72417 | 3/1993 |
| JP | A-5-107505 | 4/1993 |
| JP | A-6-18714 | 1/1994 |
| JP | 06-018714 | 1/1994 |
| JP | A-6-202046 | 7/1994 |
| JP | A-7-294906 | 11/1995 |
| JP | A-8-114765 | 5/1996 |

* cited by examiner

*Primary Examiner*—Hung Xuan Dang
*Assistant Examiner*—David N. Spector
(74) *Attorney, Agent, or Firm*—Oliff & Berridge, PLC

(57) ABSTRACT

A polarizing conversion device in accordance with the invention includes a first optical element for condensing an incident beam and forming a plurality of intermediate beams spatially separated from one another, and a second optical element for spatially separating each intermediate beam into two polarized beams and aligning the polarization directions of the polarized beams, thereby obtaining the same type of polarized beams. In the second optical element, a shading plate is placed to prevent light from directly entering a section corresponding to a reflecting plane of a polarizing separation unit array. Since the ability of separating the intermediate beam into two polarized beams is thereby enhanced, it is possible to perform conversion into the same type of polarized beams polarized in the same direction, with high efficiency.

54 Claims, 11 Drawing Sheets

POLARIZATION CONVERSION ELEMENT, POLARIZATION ILLUMINATOR, DISPLAY USING THE SAME ILLUMINATOR, AND PROJECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a polarizing conversion device and a polarizing illumination device for generating, from incident light beams as randomly polarized beams, illuminating beams that have a more uniform light intensity distribution in an illumination region than that of the incident beams and are polarized in almost the same direction. Furthermore, the present invention relates to a display apparatus and a [projection display apparatus] *projector* using these devices.

2. Description of Related Art

A polarizing illumination device capable of efficiently generating the same type of polarized light beams is ideal as an illuminating device for use in a display apparatus, such as a liquid crystal apparatus, which employs a panel for modulating polarized light beams. Accordingly, an illuminating optical system has been proposed that converts random polarized light beams emitted from a light source into the same type of polarized light beams and illuminates a liquid crystal apparatus with the light beams so that a bright display is achieved. Japanese Unexamined Patent Publication No. 7-294906 discloses an image display apparatus equipped with such an illuminating optical system.

The principal part of the illuminating optical system disclosed in Japanese Unexamined Patent Publication No. 7-294906 will be briefly described with reference to FIG. 15. This optical system mainly comprises a lens plate 910, a plurality of polarizing beam splitters 920, a plurality of reflecting prisms 930, and a plurality of λ/2phase plates 940. Incident beams as randomly polarized beams are separated into two types of polarized beams (P polarized beams and S polarized beams) through the polarizing beam splitters 920 which are respectively provided with polarizing separation planes 331 and the reflecting prisms 930 which are respectively provided with reflecting planes 332. After the separation, the polarization direction of polarized beams of one of the types is matched with that of polarized beams of the other type by using the λ/2 phase plates 940, thereby obtaining polarized beams of the same type and illuminating a liquid crystal device 950 with the light beams. In general, since a space for forming two types of polarized beams therein is needed in the polarized beam separation process, the optical system is inevitably widened. Accordingly, this optical system reduces the diameter of the beams, which are incident on the respective polarizing beam splitters 920, to less than about half the diameter of small lenses 911 formed in the lens plate 910 by means of the small lenses 911, and places the reflecting prisms (reflecting planes) 930 in the spaces produced by the reduction of the diameter of the beams, whereby the same type of polarized beams are obtained without widening the optical system.

The optical system disclosed in Japanese Unexamined Patent Publication No. 7-294906 has, however, the following problems.

In reducing the diameter of the beam by the lens, generally, the minimum beam diameter is almost directly and exclusively determined by the refractive power of the lens and parallelism of the light beam incident on the lens. That is, in order to reduce the beam diameter to less than half the lens diameter as in the optical system disclosed in Japanese Unexamined Patent Publication No. 7-294906, it is necessary to use a lens having an extremely high refractive power (in other words, a lens having an extremely small F-number) and a light source capable of emitting a light beam having extremely high parallelism. However, a real light source has a limited emission area. Therefore, parallelism of the light beam emitted from the light source is not always good.

On the other hand, the polarizing separation ability of the polarizing separation plane formed in the polarizing beam splitter is highly dependent on the incident angle of light. In other words, when the light that is incident on the polarizing separation plane has a large angular component, the polarizing separation plane cannot exhibit and ideal polarizing separation ability, and S polarized beam mixes into the P polarized beam transmitting through the polarizing separation plane, and the P polarized beam mixes into the S polarized beam reflected from the polarizing separation plane. Consequently, it is impossible to excessively increase the refractive power of the small lens used for reducing the diameter of the beam.

For the above reasons, it is difficult to sufficiently reduce the diameter of the light beam that is incident on the polarizing beam splitter, and, in actuality, a relatively large amount of light also directly enters the reflecting prism adjoining the polarizing beam splitter. The light that is directly incident on the reflecting prism is reflected by the reflecting plane, enters the adjoining polarizing beam splitter, and is separated into two types of polarized beams by the polarizing separation plane in the same manner as the light beam that is directly incident on the polarizing beam splitter. The light beam that is incident on the polarizing beam splitter through the reflecting prism and the light beam that is directly incident on the polarizing beam splitter are different by 90° in the incident with respect to the polarizing beam splitter. As a consequence of the existence of the light beam directly incident on the reflecting prism, the S polarized beam directly incident on the reflecting prism and separated through the polarizing beam splitter mixes into the P polarized beam that transmits through the polarizing beam splitter without changing its direction of travel. Similarly, the S polarized beam mixes into the P polarized beam that directly enters the polarizing beam splitter and is emitted through the reflecting prism and the λ/2 phase plate. Since the S polarized beam mixed into the P polarized beam because of the existence of the light beam directly incident on the reflecting prism is quite unnecessary for the liquid crystal device, it is absorbed by a polarizing plate and generates heat, which is the main factor that increases the temperature of the polarizing plate.

Thus, in the process in which the conventional optical system disclosed in Japanese Unexamined Patent Publication No. 7-294906 converts random light beams emitted from the light source into polarized beams of the same type, a relatively large number of polarized beams of another type inevitably mix. As a result, the polarized beams, which are unnecessary for display and are polarized in a different direction, are required to be absorbed by the polarizing plate in order to obtain an extremely bright display image. In addition, a large cooling device is essential to restrict the increase in temperature of the polarizing plate caused by the absorption of the polarized beams.

SUMMARY OF THE INVENTION

It is therefore an object of the present invention to solve the above problems by substantially restricting the mixing of other polarized beams, which are polarized in a different direction, in a process of converting randomly polarized beams emitted from a light source into the same type of polarized beams.

In order to solve the above problems, a polarizing conversion device in accordance with the present invention comprises a polarizing separation element that has a polarizing separation plane for separating P and S polarized beams by transmitting one of the polarized beams therethrough and reflecting the other polarized beam, and a reflecting plane disposed substantially parallel with the polarizing separation plane to reflect the polarized beam reflected by the polarizing separation plane toward the emergent direction of the polarized beam transmitted through the polarizing separation plane, and a selective phase plate located on the light emergent side of the polarizing separation element to align the polarization direction of one of the S and P polarized beams separated by the polarizing separation element with the polarization direction of the other polarized beam, wherein at least one of a shading means and an optical attenuating means for preventing light from directly entering the reflective plane is provided on the light incident side of the polarizing separation element.

The above structure enables the polarizing conversion device of the present invention to effectively prevent or restrict a phenomenon in which other polarized beams polarized in a different direction mix into polarized beams of almost the same type polarized in the same direction. Therefore, it is possible to generate specific polarized beams with an extremely high efficiency.

In the above-mentioned polarizing conversion device, it is preferable that the shading means or the optical attenuating means and the polarizing separation element are integrated. It is therefore possible to reduce light losses at an interface, and to thereby provide a polarizing conversion device having a high light use efficiency.

The shading means may be formed of a reflecting plate. When the shading means is formed of a reflecting plate, it does not absorb much light, and therefore, does not generate much heat. Consequently, it is possible to prevent peripheral optical elements from being thermally influenced by heat generation of the shading means. This is effective particularly when the selective phase plate is made of an organic substance that is not heat-resistant.

Furthermore, when the shading means and the polarizing separation element are integrated, the shading means may be formed of a reflecting film that is formed on the light incident surface of the polarizing separation element. Such a structure also provides similar advantages as those achieved in the situation wherein the shading means is formed of a reflecting plate. The reflecting film may be formed of a dielectric multilayer film, or a thin film of metal having high reflectivity, such as silver or aluminum.

Still furthermore, the optical attenuating means in the polarizing conversion device may be formed of a light diffusing plate. When the optical attenuating means is formed of a light diffusing plate, it is possible to reduce the cost of the polarizing conversion device.

When the shading means and the polarizing separation element are integrated, the optical attenuating means may be formed of a light diffusing surface formed on the light incident surface of the polarizing separation element. Such a structure also provides similar advantages as those achieved in the situation wherein the optical attenuating means is formed of a light diffusing plate. The light diffusing surface may be formed by roughening a specific region on the light incident surface of the polarizing separation element.

A polarizing illumination device in accordance with the present invention comprises a light source, a first optical element for separating a light beam emitted from the light source into a plurality of intermediate beams, and a second optical element disposed near the position where the intermediate beams converge, wherein the second optical element has a condenser lens array that includes a plurality of condenser lenses for respectively condensing the intermediate beams, a polarizing separation element for spatially separating each of the intermediate beams into an S polarized beam and a P polarized beam, a selective phase plate for aligning the polarization direction of one of the S and P polarized beams separated by the polarizing separation element with the polarization direction of the other polarized beam, and a superimposing lens for superimposing the polarized beams, the polarizing separation element has a polarizing separation plane for separating the P and S polarized beams by transmitting one of the polarized beams therethrough and reflecting the other polarized beam and a reflecting plane disposed substantially parallel with the polarizing separation plane to reflect the polarized beam reflected by the polarizing separation plane toward the emergent direction of the polarized beam transmitted through the polarizing separation plane, and at least one of a shading means and an optical attenuating means for preventing each of the intermediate beams from directly entering the reflecting plane is interposed between the first optical element and the polarizing separation element.

By adopting the above structure, the polarizing illumination device in accordance with the present invention can effectively prevent or restrict a phenomenon in which other polarized beams polarized in a different direction mix into polarized beams of almost the same type polarized in the same direction. Therefore, it is possible to obtain as illumination light polarized beams with a considerably high degree of polarization.

According to the above structure, an incident beam is initially separated into a plurality of intermediate beams and the intermediate beams are finally superimposed on one illumination region. Therefore, even if the intensity distribution of the incident beam is very imbalanced in the cross section thereof, it is possible to use as illumination light polarized beams that are uniform in brightness and color. Furthermore, even when each of the intermediate beams cannot be separated into a P polarized beam and an S polarized beam that have equal light intensity and spectral characteristics, and even when the light intensity and the spectral characteristics of one of the polarized beams changes in a process of aligning the polarization directions of the polarized beams, it is possible to use as illumination light polarized beams that are uniform in brightness and color.

In addition, a plurality of polarized beam brought into almost one type of polarization state are gathered as a whole, superimposed on one illumination region, and form a large bundle of beams. Since the polarized beams of this large bundle of beams themselves do not accompany a beam component that has a large divergence angle, illumination with these light beams secures a high illumination efficiency.

The light source may include a light source lamp and a reflector. A metal halide lamp, a xenon lamp, a halogen lamp, and similar devices may be used as the light source lamp, and a parabolic reflector, an elliptic reflector, a spherical reflector, and similar devices may be used as the reflector.

In the above polarizing illumination device, the shading means or the optical attenuating means may be placed at any position between the polarizing separation element and the first optical element. However, if the shading means or the optical attenuating means is integrated with the polarizing separation element, it is possible to reduce light loss at the interface and to therapy provide a polarizing illumination device having a high light use efficiency. Furthermore, the second optical element can be formed in one piece by integrating the shading means or the optical attenuating means and the polarizing separation element, and in that situation, the second optical element can be made to be considerably compact.

The shading means or the optical attenuating means may be integrated with the condenser lens array. This provides similar advantages to those of the situation in which the shading means or the optical attenuating means is integrated with the polarizing element. Furthermore, in this situation, when the condenser lens array integrated with the shading means or the optical attenuating means is placed spatially apart from other optical elements to form the second optical element (for example, the polarizing separation element and the selective phase plate), even if the shading means or the optical attenuating means generates heat due to light absorption, it is possible to prevent the other optical elements from being thermally influenced by the heat generation.

In the above polarizing illumination device, the shading means may be formed of a reflecting plate. When the shading means is formed of a reflecting plate, it does not absorb much light, and therefore, does not generate much heat. Consequently, it is possible to prevent peripheral optical elements from being thermally influenced by heat generation of the shading means. This is effective particularly when the selective phase plate is made of an organic substance that has small heat resistance. Moreover, when the shading means is formed of a reflecting plate, light reflected by the reflecting plate is allowed to return the light source once, to be reflected again by the reflector at the light source, and to enter the polarizing separation element again. Therefore, it is possible to effectively use the light from the light source without waste.

Furthermore, when the shading means is integrated with the polarizing conversion device and the condenser lens array, the shading means may be formed of a reflecting film that is formed on the light incident surface of the polarizing separation element or the light emergent surface of the condenser lens array. Such a structure also provides similar advantages to those of the situation in which the shading means is formed of a reflecting plate. The reflecting film may be formed of a dielectric multilayer film, or a thin film of metal having high reflectivity, such as silver or aluminum.

In the above polarizing illumination device, the optical attenuating means may be formed of a light diffusing plate. When the optical attenuating means is formed of a light diffusing plate, it is possible to achieve cost reduction of the polarizing illumination device.

When the optical attenuating means is integrated with the polarizing conversion device of the condenser lens array, it may be formed of a light diffusing surface formed on the light incident surface of the polarizing separation element or the light emergent surface of the condenser lens array. Such a structure also provides similar advantages as those achieved in the situation in which the optical attenuating means is formed of a light diffusing plate, and the situation in which the optical diffusing plate is integrated with the polarizing separation element or the condenser lens array. The light diffusing surface may be formed by roughening a specific region on the light incident surface of the polarizing separation element or the light emergent surface of the condenser lens array.

A display apparatus in accordance with the present invention comprises a light source, a first optical element for separating a light beam emitted from the light source into a plurality of intermediate beams, a second optical element located near the position where the intermediate beams converge, and a modulating device for modulating a light beam emitted from the second optical element, wherein the second optical element has a condenser lens array that includes a plurality of condenser lenses for respectively condensing the intermediate beams, a polarizing separation element for spatially separating each of the intermediate beams into an S polarized beam and a P polarized beam, a selective phase plate for aligning the polarization direction of one of the S and P polarized beams separated by the polarizing separation element with the polarization direction of the other polarized beam, and a superimposing lens for superimposing the polarized beams, the polarizing separation element has a polarizing separation plane for separating the P and S polarized beams by transmitting the one of the polarized beams therethrough and reflecting the other polarized beam and a reflecting plane disposed substantially parallel with the polarizing separation plane to reflect the polarized beam reflected by the polarizing separation plane toward the emergent direction of the polarized beam transmitted through the polarizing separation plane, and at least one of a shading means and an optical attenuating means for preventing each of the intermediate beams from directly entering the reflecting plane is interposed between the first optical element and the polarizing separation element.

By adopting the above structure, the display apparatus in accordance with the present invention can effectively prevent a phenomenon in which other polarized beams polarized in a different direction mix into polarized beams of almost the same type polarized in the same direction. Therefore, when a polarizing plate is used to obtain a required polarized beam modulated by the modulating device, it is possible to prevent the increase in temperature of the polarizing plate caused by absorption of an unnecessary polarized beam, and to substantially simplify and miniaturize a cooling device for cooling the polarizing plate. A liquid crystal device may be used as the modulating device.

According to the above structure, an incident beam is initially separated into a plurality of intermediate beams and the intermediate beams are finally superimposed on the modulating device. Therefore, even if the light distribution of the light emitted from the light source is very imbalanced in the cross section thereof, it is possible to obtain as illumination light polarized beams that are uniform in brightness and color. Consequently, it is possible to achieve a compact display apparatus capable of producing a display that is bright and uniform in brightness and color.

A [projection display apparatus] *projector* in accordance with the present invention comprises a light source, a first optical element for separating a light beam emitted from the light source into a plurality of intermediate beams, a second optical element disposed near the position where the intermediate beams converge, a modulating device for modulating a light beam emitted from the second optical element, and a projection optical system for projecting the light beam modulated by the modulating device onto a projection plane, wherein the second optical element has a condenser lens array that includes a plurality of condenser lenses for respectively condensing the intermediate beams, a polarizing separation element for spatially separating each of the intermediate beams into an S polarized beam and a P polarized beam, a selective phase plate for aligning the polarization direction of one of the S and P polarized beams separated by the polarizing separation element with the polarization direction of the other polarized beam, and a superimposing lens for superimposing the polarized beams, the polarizing separation element has a polarizing separation plane for separating the P and S polarized beams by transmitting one of the polarized beams therethrough and reflecting the other polarized beam and a reflecting plane located almost in parallel with the polarizing separation plane to reflect the polarized beam reflected by the polarizing separation plane toward the emergent direction of the polarized beam transmitted through the polarizing separation plane, and at least one of a shading means and an optical attenuating means for preventing each of the intermediate beams from directly entering the reflecting plane is interposed between the first optical element and the polarizing separation element.

By adopting the above structure, the [projection display apparatus] *projector* of the present invention can effectively prevent a phenomenon in which other polarized beams polarized in a different direction mix into polarized beams of almost the same type polarized in the same direction. Therefore, when a polarizing plate is used to obtain a required polarized beam to be modulated by the modulating device, it is possible to prevent the increase in temperature of the polarizing plate caused by absorption of an unnecessary polarized beam, and to substantially simplify and reduce the size of a cooling device for cooling the polarizing plate. A liquid crystal device may be used as the modulating device.

According to the above structure, an incident beam is initially separated into a plurality of intermediate beams and the intermediate beams are finally superimposed on the modulating device. Therefore, even if the intensity distribution of the light emitted from the light source is very imbalanced in the cross section thereof, it is possible to obtain as illumination light polarized beams that are uniform in brightness and color. Consequently, it is possible to achieve a compact display apparatus capable of producing a display that is bright and uniform in brightness and color.

The [projection display apparatus] *projector* further comprises a color light separation means for separating the light beam emitted from the second optical element into a plurality of colored lights, a plurality of modulating devices for respectively modulating the colored lights, and a colored light synthesizing means for synthesizing the colored lights modulated by the modulating devices, wherein a synthesized beam synthesized by the colored light synthesized means is projected onto the projection plane through the projection optical system. Since exclusive modulating devices can be placed respectively for more than two separated colored lights, it is possible to achieve a compact [projection display apparatus] *projector* capable of projecting and displaying a color image that is bright and has a high color reproducibility and a high resolution.

In the above [projection display apparatus] *projector*, the modulating device may be formed of a reflection-type liquid crystal device. In general, the reflection-type liquid crystal device provides the advantage of easily obtaining a relatively high aperture ratio even if pixel density is increased. Therefore, adopting of the above structure makes it possible to achieve a compact [projection display apparatus] *projector* capable of projecting and displaying a color image that is bright and has a high color reproducibility and a high resolution.

DETAILED DESCRIPTION OF PREFERRED EMBODIMENTS

Modes for carrying out the present invention will be described below in connection with embodiments and with reference to the drawings. In the following embodiments, three directions orthogonal to one another are, for the sake of convenience, taken as an X direction (lateral direction), a Y direction (longitudinal direction), and a Z direction, unless otherwise stated. Although S polarized beams are obtained as the same type of polarized beams of the same type from randomly polarized beams in any of the embodiments, of course. P polarized beams may be obtained. Moreover, in the embodiments that will be described below, sections that have substantially the same functions and structure are denoted by the same numerals, and a description thereof is omitted.

First Embodiment

Figure 1:
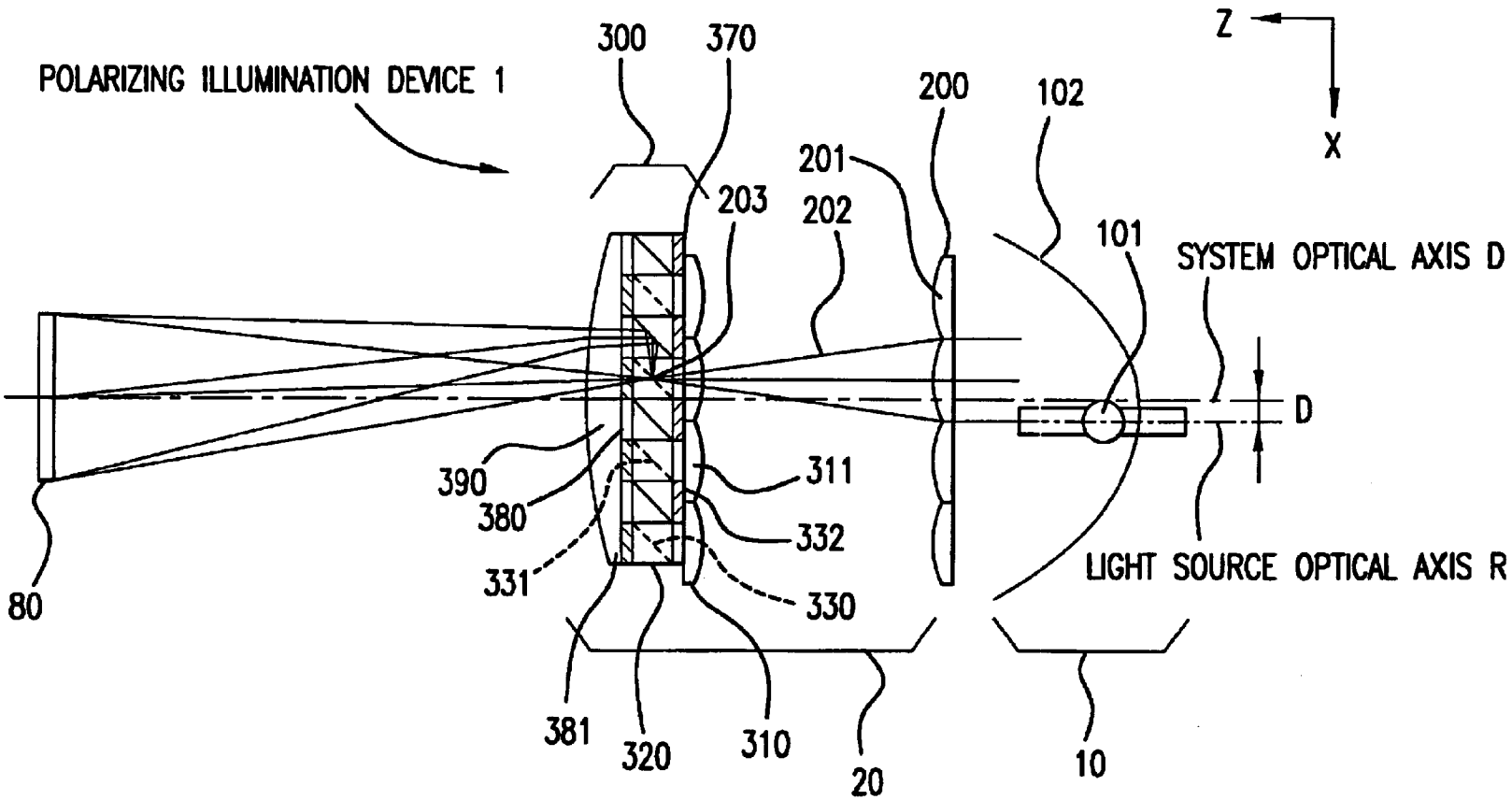
FIG. 1 is a schematic structure view of an optical system in a polarizing illumination device according to a first embodiment of the present invention.

FIG. 1 is a schematic structural plan view of the principal part of a polarizing illumination device according to a first embodiment. FIG. 1 is a plan view in the XZ plane which passes through the center of a first optical element 200 which will be described later. The polarizing illumination device 1 of this embodiment generally comprises a light source section 10 and a polarized light generation device 20 that are arranged along a system optical axis L. Light beams emitted from the light source section 10 and polarized in random directions (hereinafter referred to as randomly polarized beams) are converted by the polarized light generating device 20 into the same type of polarized beams that are polarized in almost the same direction, and directed to an illumination region 90.

The light source section 10 generally comprises a light source lamp 101 and a parabolic reflector 102. Light radiated from the light source lamp is reflected by the parabolic reflector 102 in one direction, and made incident on the polarized light generating device 20 in the form of almost parallel light beams. The light source section 10 is placed so that a light source optical axis R thereof is shifted in parallel from the system optical axis L by a required distance D in the X direction.

The polarized light generating device 20 comprises a first optical element 200 and a second optical element 300.

Figure 2:
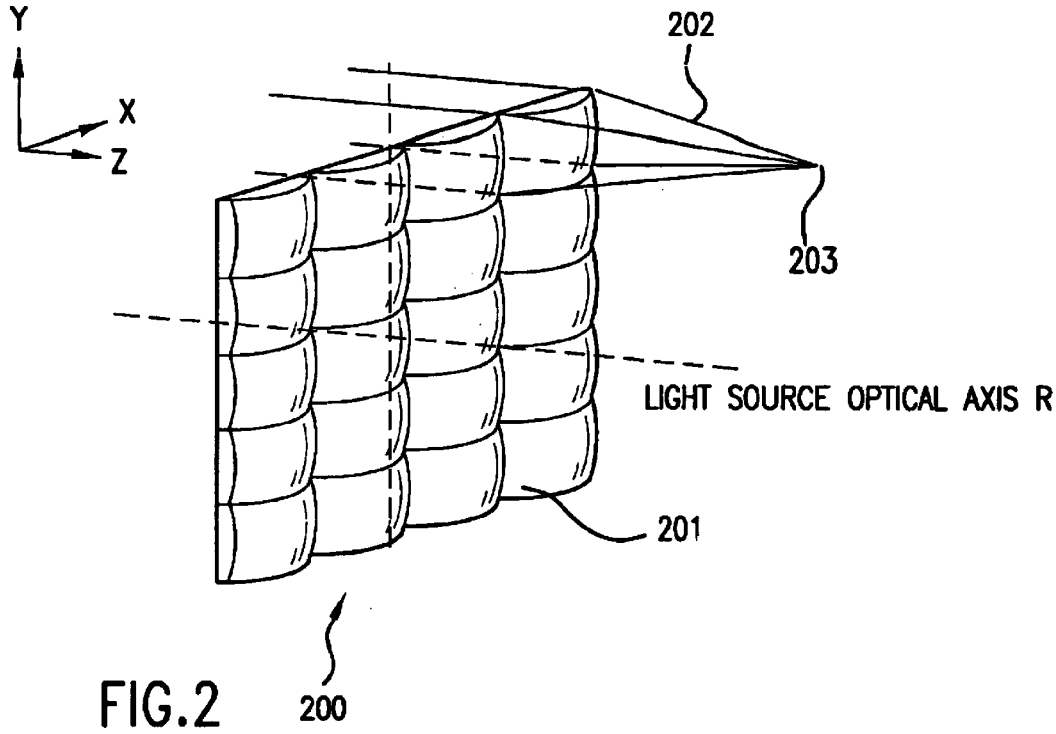
FIG. 2 is a perspective view of a first optical element according to the first embodiment of the present invention.

The first optical element 200, as outwardly shown in FIG. 2, includes a matrix of a plurality of beam splitting lenses 201 each having a rectangular outline in the XY plane. The positional relationship between the light source section 10 and the first optical element 200 is set so that the light source optical axis R aligns with the center of the first optical element 200. Light that is incident on the first optical element 200 is split into a plurality of intermediate beams 202 by each beam splitting lens 201, and simultaneously, the same number of condensed images 203 as that of the beam splitting lenses are formed, by a condensing action of the beam splitting lenses, at positions in a plane (the XY plane in FIG. 1) perpendicular to the system optical axis L, where the intermediate beams coverage. The outline of each beam splitting lens 201 in the XY plane is set so that it is similar to that of the illumination region 90. Since it is assumed that the illumination region in this embodiment extends laterally in the X direction in the XY plane, the outline of the beam splitting lens 201 in the XY plane is also extended laterally.

The second optical element 300 is a complex that generally includes a condenser lens array 310, a shading plate 370, a polarizing separation until array 320, a selective phase plate 380, and a superimposing lens 390, and is placed in a plane (the XY plane in FIG. 1) perpendicular to the system optical axis L near the positions where the condensed images 203 are formed by the first optical element 200. When the light beams that are incident on the first optical element 200 are extremely parallel, the condenser lens array 310 does not have to be included in the second optical element. The second optical element 300 operates to spatially separate each intermediate beam 202 into a P polarized beam and an S polarized beam, aligns the polarization direction of one polarized beam and that of the other polarized beam, and directs the beams polarized in substantially the same direction to one point in the illumination region 90.

The condenser lens array 310 has almost the same structure as the first optical element 200, that is, it comprises a matrix of the same number of condenser lenses 311 as that of the beam splitting lenses 201 of the first optical element 200. The condenser lens array 310 operates to condense and direct each intermediate beam to a specific position in the polarizing separation unit array 320. Therefore, it is preferable to optimize the lens properties of the condenser lenses in accordance with the properties of the intermediate beams 202 formed by the first optical element 200, and considering that the ideal placement of the principal ray of the light incident on the polarizing separation unit array 320 is parallel with the system optical axis L. Generally, in consideration of cost reduction and easy design of the optical system, an element entirely identical with the first optical element 200 may be used as the condenser lens array 310, or a condenser lens array that includes condenser lenses similar in shape to the beam splitting lenses 201 in the XY plane may be used. Therefore, in this embodiment, the first optical element 200 is used as the condenser lens array 310. The condenser lens array 310 may be placed apart from the shading plate 370 and the polarizing separation unit array 320 (on the side closer to the first optical element 200).

Figure 3:
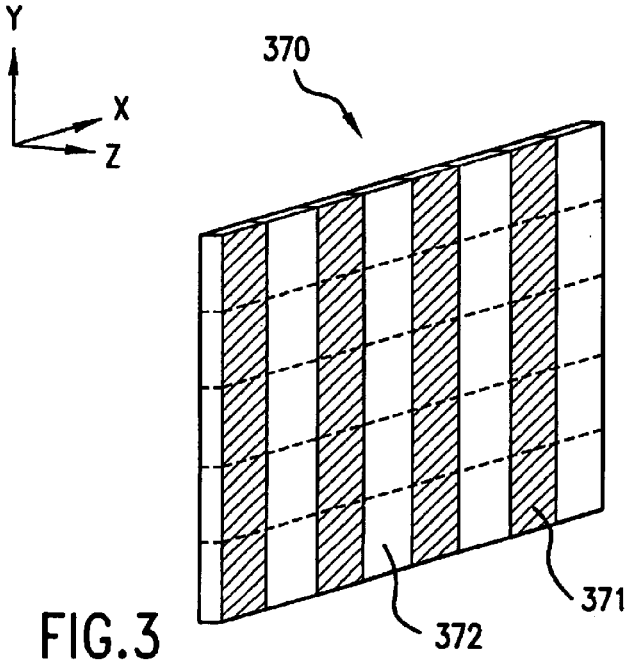
FIG. 3 is a perspective view of a shading plate according to the first embodiment of the present invention.

The shading plate 370, as outwardly shown in FIG. 3, includes an array of a plurality of shading surfaces 371 and a plurality of open surfaces 372. The shading surfaces 371 and the open surfaces 372 are arranged in a manner corresponding to the arrangement of polarizing separation units 330 which will be described later. Four broken lines parallel with the X axis on the shading plate 370 in FIG. 3 are drawn to explain the correspondence to the polarizing separation unit array which will be described later. This also applies to a reflecting plate 373 shown in FIG. 6 and a light diffusing plate 376 shown in FIG. 7. Light beams that are incident on the shading surfaces 371 of the shading plate 370 are blocked, and light beams that are incident on the open surfaces 372 pass through the shading plate 370 unchanged. Therefore, the shading plate 370 operates to control the light beams in accordance with the positions thereon where the light beams transmit, and the shading surfaces 371 and the open surfaces 372 are arranged so that the condensed images 203 are respective formed by the first optical element 200 only on polarizing separation planes 331 of the polarizing separation units 330 which will be described later. A flat transparent member, such as a glass plate, partially provided with opaque films made of chrome, aluminum or similar materials as in this embodiment, an opaque flat plate, such as an aluminum plate, provided with open sections, and similar structures may be used as the shading plate 370. Particularly, when opaque films are used, even if they are directly formed on the condenser lens array 310 or the polarizing separation unit array 320, which will be described later, it is possible to provide similar functions.

Figure 4:
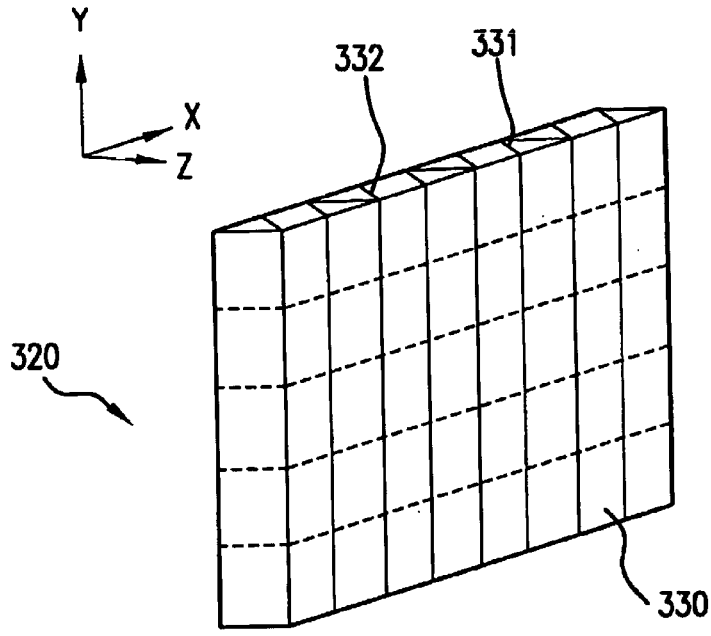
FIG. 4 is a perspective view of a polarizing separation unit array according to the first embodiment of the present invention.

The polarizing separation unit array 320, as outwardly shown in FIG. 4, includes a matrix of a plurality of polarizing separation units 330. The polarizing separation units 330 are arranged corresponding to the lens properties and arrangement of the beam splitting lenses 201 which form the first optical element 200. Since the first optical element 200 include the concentric beam splitting lenses 201 which all have the same lens properties and are arranged in a rectangular matrix in this embodiment, the polarizing separation unit array 320 also includes all the same polarizing separation units 320 which are arranged in the same direction and in a crossed matrix. When the polarizing separation units aligned in the Y-direction column are of all the same type, it is preferable that the polarizing separation unit array 320 include polarizing separation units which are long in the Y direction and are arranged in the X direction, which is advantageous in reducing light losses at the interfaces between the polarizing separation units and in reducing the production cost of the polarizing separation unit array.

Figure 5:
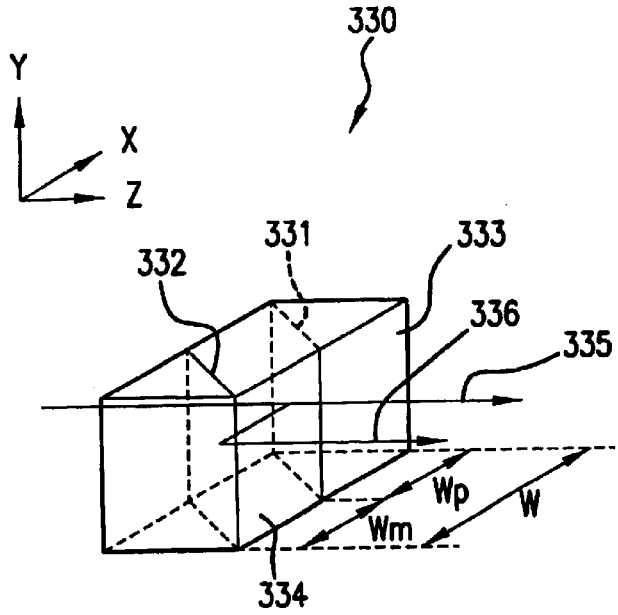
FIG. 5 is a view showing the operation of a polarizing separation unit according to the first embodiment of the present invention.

Each polarizing separation unit 330 is, as outwardly shown in FIG. 5, a member shaped like a quadrangular prism and provided with a polarizing separation plane 331 and a reflecting plane 332 therein, and operates to spatially separate each intermediate light beam, that enters the polarizing separation unit, into a P polarized beam and an S polarized beam. The outline of the polarizing separation unit 330 in the XY plane is similar to that of the beam splitting lens 201 in the XY plane, that is, it is shaped like a rectangular which is extended laterally. Therefore, the polarizing separation plane 331 and the reflecting plane 332 are placed so that they are arranged in the lateral direction (the X direction). The polarizing separation plane 331 and the reflecting plane 332 are placed so that the polarizing separation plane 331 inclines at about 45° with respect to the system optical axis L, the reflecting plane 332 is parallel to the polarizing separation plane 331. The projection area of the polarizing separation plane 331 in the XY plane (that is equal to the area of a P emergent surface 333 described later) and the projection area of the reflecting plane 332 in the XY plane (that is equal to the area of an S emergent surface 334 described later) are equal to each other. Therefore, in this embodiment, a width Wp of a region in the XY plane, where the polarizing separation plane 331 exists, and a width Wm of a region in the XY plane, where the reflecting plane 332 exists, are equally set so that they are each half a width W of the polarizing separation unit in the XY plane. In general, the polarization separation plane 331 may be made of a dielectric multilayer film, and the reflecting plane 332 may be made of a dielectric multilayer film or an aluminum film.

Light incident on the polarizing separation unit 330 is separated by the polarizing separation plane 331 into a P polarized beam 335 that transmits through the polarizing separation plane 331 without changing its direction of travel and an S polarized beam 336 that is reflected by the polarizing separation plane 331 and changes its direction of travel toward the adjoining reflecting plane 332. The P polarized beam 335 is emitted from the polarizing separation unit through the P emergent surface 33 unchanged, and the S polarized beam 336 again changes its direction of travel at the reflecting plane 332, and is emitted from the polarizing separation unit through the S emergent surface 334 substantially parallel with the P polarized beam 335. Therefore, randomly polarized beams incident on the polarizing separation unit 330 are separated into two types of polarized beams polarized in different directions, the P polarized beam 335 and the S polarized beam 336, and are emitted substantially the same direction from different sections of the polarizing separation unit (the P emergent surface 333 and the S emergent surface 344). Since the polarizing separation unit has the above-mentioned functions, it is necessary to lead each intermediate beam 202 to the region of the polarizing separation unit 330 where the polarizing separation plane 331 exists. Accordingly, the positional relationship between each polarizing separation unit 330 and each condenser lens 311 and the lens properties of the condenser lens 311 are set so that the intermediate beam enters the center of the polarizing separation plane in the polarizing separation unit. Particularly, in this embodiment, the condenser lens array 310 is placed offset from the polarizing separation unit array 320 by the distance D, which corresponds to ¼ of the width W of the polarizing separation unit, in the X direction so that the center axis of each condenser lens aligns with the center of the polarizing separation plane 331 in each polarizing separation unit 330.

Any polarizing separation unit array may be used as long as the above-mentioned polarizing separation planes and reflecting planes are regularly formed therein, and it is not always necessary to use the above-mentioned polarizing separation units as basic constituents. Herein, the polarizing separation units are discussed as constituents only to explain the function of the polarizing separation unit array.

Description will be made again with reference to FIG. 1.

The shading plate 370 is interposed between the polarizing separation unit array 320 and the condenser lens array 310 so that the center of each open surface 372 of the shading plate 370 is substantially aligned with the center of the polarizing separation plane 331 of each polarizing separation unit 330. The opening width of the open surface 372 (the opening width in the X direction) is set about half the width W of the polarizing separation unit 330. As a result, since intermediate beams are previously blocked by the shading surface 371 of the shading plate 370, there are few beams that directly enter the reflecting plane 332 without passing through the polarizing separation plane 331, and most of the light beams passed through the open surface 372 of the shading plate 370 enter only the polarizing separation plane 331. Consequently, because of such placement of the shading plate 370, few light beams directly enter the reflecting planes 332 and enter the adjoining polarizing separation planes 331 through the reflecting planes 332 in the polarizing separation unit.

The selective phase plate 380, in which λ/2 phase plates 381 are regularly arranged, is placed on the emergent side of the polarizing separation unit array 320. That is, the λ/2 phase plates 381 are respectively placed only at the P emergent surfaces 333 of the polarizing separation units 330 which form the polarizing separation unit array 320, and no λ/2 phase plates 381 are placed at the S emergent surfaces 334 (see FIG. 5). According to such an arrangement of the λ/2 phase plates 381, when P polarized beams emitted from the polarizing separation units 330 respectively pass through the λ/2 phase plates 381, they are conventional into S polarized beams by a polarization direction rotation action. On the other hand, since S polarized beams emitted from the S emitting surfaces 334 do not pass through the λ/2 phase plates 381, they do not change their polarization direction and pass through the selective phase plate 380 unchanged. In summary, intermediate beams polarized in random directions are converted into polarized beams of the same type (in this case, the S polarized beams) by the polarizing separation unit array 320 and the selective phase plate 380.

The superimposing lens 390 is placed on the emitting side of the selective phase plate 380. The light beams, which are converted into the S polarized beams by the selective phase plate 380, are directed to the illumination region 90 by the superimposing lens 390 and superimposed on the illumination region. The superimposing lens 390 is not limited to a single lens member, and it may be an assembly of a plurality of lenses like the first optical element 200.

To summarize the operations of the second optical element 300, the intermediate beams 202 separated by the first optical element 200 (that is, image planes cut out by the beam splitting lenses 201) are superimposed on the illumination area 90 by the second optical element 300. At the same time, the intermediate beams, which are randomly polarized beams, are spatially separated into two types of polarized beams polarized in different directions by the polarizing separation unit array 320 placed in the path, and converted into substantially one type of polarized beams when they pass through the selective phase plate 380. Since the shading plate 370 is placed on the incident side of the polarizing separation unit array 320 and the intermediate beams are thereby allowed to enter only the polarizing separation planes 331 in the polarizing separation units 330, few intermediate beams enter the polarizing separation planes 331 through the reflecting planes 332, and therefore, the polarized beams emitted from the polarizing separation unit array 320 are limited to substantially one type. Consequently, the illumination region 90 is illuminated substantially uniformly with substantially one type of polarized beams.

As described above, the polarizing illumination device 1 of this embodiment is advantageous in that randomly polarized beams emitted from the light source section 10 are converted into substantially one type of polarized beams by the polarized light generating device 20 that includes the first optical element 200 and the second optical element 300, and the illumination region 90 can be illuminated uniformly with the light beams polarized in the same direction. Moreover, since the process of generating the polarized beams accompanies little loss of light, almost all the light emitted from the light source section can be directed to the illumination region 90, which provides extremely high light use efficiency. Furthermore, since the shading plate 370 is placed in the second optical element 300, other beams polarized in a different direction rarely mix into polarized beams of the same type for illuminating the illumination region 90. Therefore, when the polarizing illumination device of the present invention is used as a device for illuminating a modulating device that produces a display using polarized beams such as a liquid crystal device, it is possible to obviate a polarizing plate which is conventionally placed on the side of the modulating device where the illumination light enters. Even if the polarizing plate is placed as is conventionally done, since the amount of light absorbed by the polarizing plate is extremely small, it is possible to substantially reduce the size of a cooling device that is needed to minimize heat generation of the polarizing plate and the modulation device. As mentioned above, the size of the condensed images 203 formed by the first optical element 200 is influenced by the parallelism of light beams that enter the first optical element (light beams emitted from the light source in the illumination device). When parallelism is low, since only a large condensed image can be formed, a large number of intermediate beams directly enter the reflecting planes without passing the polarizing separation planes in the polarizing separation units, and therefore, a phenomenon in which other beams polarized in a different direction mix into the illumination beams is inevitable. Accordingly, the structure of the polarizing illumination device of the present invention has a great effect, particularly in adopting a light source for emitting light beams having low parallelism in the apparatus.

In this embodiment, the condenser lens array 310, the shading plate 370, the polarizing separation unit array 320, the selective phase plate 380, and the emergent-side lens 390, which form the second optical element 300, are optically integrated, so that light losses caused at interfaces therebetween are reduced, and the light use efficiency is further enhanced. Although it is not always necessary to optically integrate these optical elements, it is preferable to optically integrate or fix the shading plate 370 on the light incident surface of the polarizing separation unit array 320 in order to effectively prevent other beams polarized in a different direction from mixing into the illumination light. As a method of optically integrating the shading plate 370 with the light incident surface of the polarizing separation unit array 320, it is possible to stick the shading plate 370 to the light incident surface of the polarizing separation unit array 320 with an adhesive layer, or to directly form the shading surfaces 371 on the light incident surface of the polarizing separation unit array 320 as will be described later. On the other hand, as a method of fixing the shading plate 370 on the light incident surface of the polarizing separation unit array 320, it is possible to stick the peripheral portion of the shading plate 370 on the peripheral portion of the light incident surface of the polarizing separation unit array 320 by using a double-sided tape or similar device. In this situation, it is necessary to stick the entire peripheral portion of the shading plate 370, and the peripheral portion only has to be stuck at at least two points. In order to fix the shading plate 370 parallel with the light incident surface of the polarizing separation unit array 320, it is preferable to set the sticking points so that they are almost symmetrical with respect to the center point of the shading plate 370.

Furthermore, the beam splitting lenses 201 which form the first optical element 200 each extend laterally in accordance with the shape of the illumination region 90 like a laterally extended rectangle, and at the same time, two types of polarized beams emitted from the polarizing separation unit array 320 are separated in the lateral direction (the X direction). This makes it possible to enhance illumination efficiency (light use efficiency) without wasting the light even in illuminating the illumination region 90 which is shaped like a laterally extended rectangle.

In general, when light beams polarized in random directions are merely separated into P polarized beams and S polarized beams, the overall width of the separated beams doubles, which increases the size of the optical system. The polarizing illumination device of the present invention, however, forms a plurality of minute condensed images 203 through the first optical element 200, effectively uses the spaces provided in the formation process where no light exists, and respectively places the reflecting planes 332 of the polarization separation units 330 in the spaces, thereby absorbing the lateral widening of the beams caused by the separation into two types of polarized beams. As a result, the overall width of the beams does not increase, and a compact optical system can be achieved.

First Modification of First Embodiment

Figure 6:
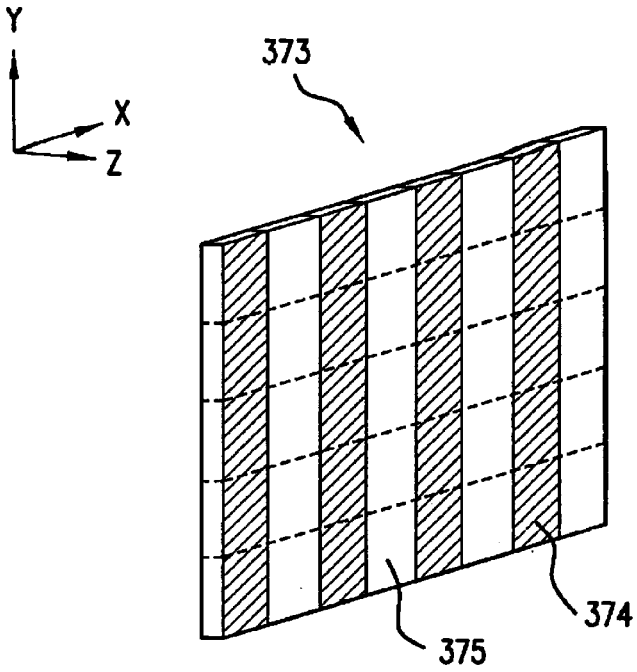
FIG. 6 is a perspective view of a shading plate according to a first modification of the first embodiment of the present invention.

In the first embodiment, the shading surfaces 371 that form the shading plate 370 may be replaced with reflecting planes for reflecting light in almost the opposite direction. That is, a reflecting plate 373 that includes a plurality of reflecting surfaces 374 and a plurality of open surfaces 375, as shown in FIG. 6, may be adopted instead of the shading plate 370 in the first embodiment. The reflecting surfaces 374 each can easily be formed of a dielectric multilayer film, a thin film made a metal having high reflectivity, such as silver or aluminum, or a combination thereof, and an extremely high reflectivity of more than ninety percent can be obtained depending on the type of the film. Even if the reflecting surfaces 374 are directly formed on the condenser lens array 310 or the polarizing separation unit array 320 shown in FIG. 1, similar functions are provided.

As opposed to the shading surfaces 371, the reflecting surfaces 374 hardly absorb light. Therefore, the adoption of the reflecting plate 373 can prevent peripheral optical elements from being thermally influenced by heat generation thereof. In addition, the light reflected by the reflecting surfaces 374 and reflected by the parabolic reflector 102 placed in the light source section 10, can make enter again into the polarized light generating device 20 and lead into the open sections 375 of the reflecting plate 373. Then it is possible to efficiently use the light from the light source without waste.

Second Modification of First Embodiment

Figure 7:
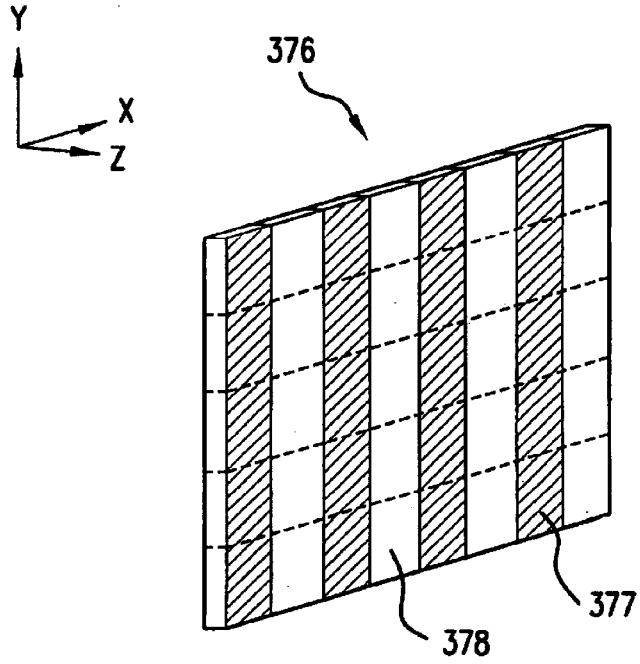
FIG. 7 is a perspective view of a shading plate according to a second modification of the first embodiment of the present invention.

In the first embodiment, even if the shading surfaces for forming the shading plate are replaced with light diffusing surfaces for diffusing light, almost the same advantages as those obtained by the shading surfaces can be provided. That is, in the first embodiment, a light diffusing plate 376 that includes an arrangement of a plurality of light diffusing surfaces 377 and a plurality of open surfaces 378, as shown in FIG. 7, may be adopted instead of the shading plate 370. Since light incident on the light diffusing surface 377 is diffused, it is possible to substantially reduce the intensity of light that directly enters the reflecting plane without passing through the polarizing separation plane of the polarizing separation unit, and to effectively prevent a phenomenon in which other beams polarized in a different direction mix into illuminating beams including substantially the same type of polarized beams that are polarized in the same direction. Each light diffusing surface 377 can easily be realized by forming a light diffusing member on or inside a flat transparent substrate, making the surface of the transparent substrate uneven, or merely roughening the surface thereof. Even if the light diffusing surfaces 377 are directly formed on the condenser lens array 310 or the polarizing separation unit array 320 shown in FIG. 1, similar functions can be provided.

Adopting the light diffusing plate 376 makes it possible to reduce the cost compared with adopting the shading plate 370 and the reflecting plate 373 using dielectric multilayer films, metal thin films, or similar materials.

Third Modification of First Embodiment

Although the shading plate 370, the reflecting plate 373 and the light diffusing plate 376 in the first embodiment and the above-mentioned first and second modifications are each an optical element that is physically independent from the condenser lens array 310 and the polarizing separation unit array 320 located in front and in the rear thereof, even if the shading surface 371 for forming the shading plate 370, the reflecting surfaces 374 for forming the reflecting plate 373, or the light diffusing surfaces 377 for forming the light diffusing plate 376 are directly formed on the light incident surfaces of the polarizing separation units 330 for forming the polarizing separation unit array 320, the same advantages as those obtained in the use of these optical elements can be obtained.

Figure 8:
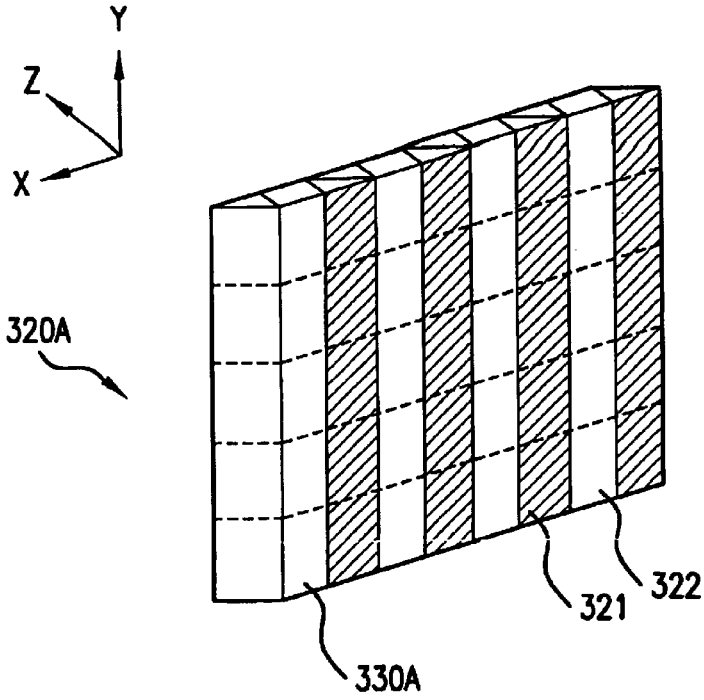
FIG. 8 is a perspective view of a polarizing separation unit array according to a third modification of the first embodiment of the present invention.

This modification will be specifically described with reference to FIG. 8. In a polarizing separation unit array 320A whose outward appearance is shown in FIG. 8, shading surfaces 321 are directly formed on light incident surfaces of polarizing separation units 330A which form the polarizing separation unit array 320A, and regions 322 where no shading surfaces are formed correspond to the open surfaces 372 of the above-mentioned shading plate 370 for transmitting light therethrough. When the polarizing separation unit array 320A having the shading surfaces 321 directly formed thereon is used as in this modification, since there is no need to use the shading plate 370 as a physically independent optical element, it is possible to reduce the size and cost of the second optical element. Of course, reflecting surfaces of light diffusing surfaces may be directly formed on the polarizing separation units 330A instead of the shading surfaces 321, and this situation provides the same advantages as those of this modification.

Fourth Modification of First Embodiment

Although the shading plate 370, the reflecting plate 373 and the light diffusing plate 376 in the first embodiment and the above-mentioned first and second modifications are each an optical element that is physically independent from the condenser lens array 310 and the polarizing separation unit array 320 located in front and in the rear thereof, even if the shading surfaces 371 for forming the shading plate 370, the reflecting surfaces 373 for forming the reflecting plate 373, or the light diffusing surfaces 374 for forming the light diffusing plate 376 are directly formed on the condenser lenses 311 for forming the condenser lens array 310, the same advantages as those in the use of these optical elements can be obtained.

Figure 9:
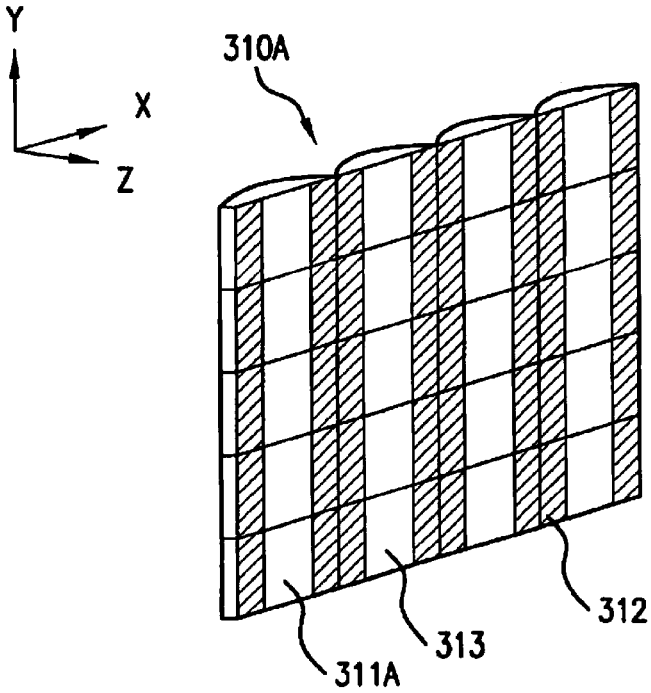
FIG. 9 is a perspective view of a condenser lens array according to a fourth modification of the first embodiment of the present invention.

This modification will be specifically described with reference to FIG. 9. In a condenser lens array 310A whose outward appearance is shown in FIG. 9, shading surfaces 312 are directly formed on surfaces of condenser lenses 311A for forming the condenser lens array 310A from which light is emitted, and regions 313 where no shading surfaces are formed correspond to the open surfaces 372 of the above-mentioned shading plate 370 for transmitting light therethrough. When the condenser lens array 310A having the shading surfaces 312 directly formed thereon is used as in this modification, since there is no need to use the shading plate 370 as a physically independent optical element, it is possible to reduce the size and cost of the second optical element. Of course, reflecting surfaces or light diffusing surfaces may be directly formed on the condenser lenses 311A instead of the shading surfaces 312 of this modification, and this case provides the same advantages as those of this modification. In this modification, if the condenser lens array 310A is placed spatially apart from the polarizing separation unit array and the selective phase plate that are other optical elements for forming the second optical element, it is possible to prevent the optical elements from being influenced by heat generation resulting from light absorption by the shading surfaces, the reflecting surfaces, and the light diffusing surfaces.

Fifth Modification of First Embodiment

Although a flat transparent member like a glass plate is partially provided with opaque films made of chrome, aluminum, or similar material in the shading plate 370 of the first embodiment, an opaque flat plate such as an aluminum plate may be provided with open sections.

Figure 10:
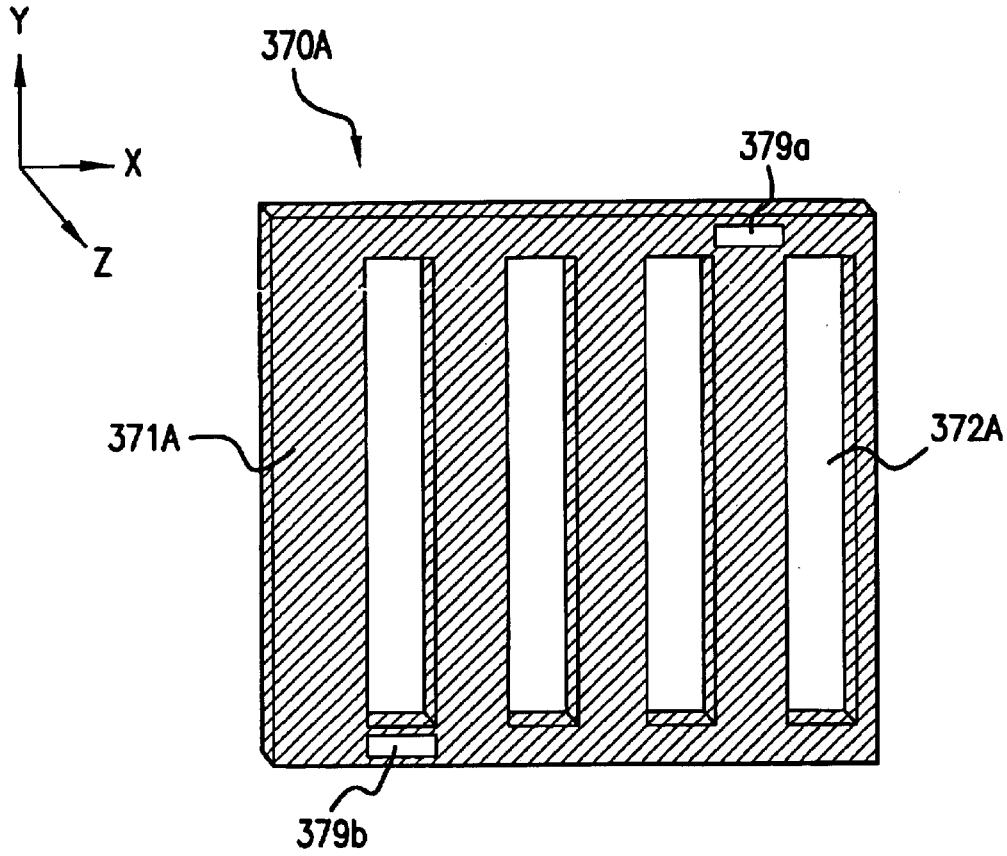
FIG. 10 is a perspective view of a shading plate according to a fifth modification of the first embodiment of the present invention.

This modification will be specifically described with reference to FIG. 10. In a shading plate 370A whose outward appearance is shown in FIG. 10, an opaque flat plate 371A is provided with open sections 372A. When the shading plate 370A is fixed on the light incident surface of the polarizing separation unit array 320 in order to effectively prevent other beams polarized in a different direction from mixing into the illumination light, two sticking points 379a and 379b on the peripheral section of the shading plate 371A are fixed on the light incident surface of the polarizing separation unit array 230 with double-sided tapes. Since the sticking points 379a and 379b are positioned so that they are almost symmetrical with respective to the center point of the shading plate 370A, the shading plate 370A is allowed to be fixed in parallel with the light incident surface of the polarizing separation unit array 320.

When the shading plate 370A having the opaque flat plate 371A, such as an aluminum plate, provided with the open sections 372A is used as in this modification, it is possible to reduce the costs compared with the shading plate 370 in which a flat transparent member, such as a glass plate, is partially provided with opaque films made of chrome, aluminum, or similar material.

Second Embodiment

A description will be given of a direct-view display apparatus in which the polarizing illumination device 1 of the first embodiment is incorporated. In this embodiment, a transmission-type liquid crystal device is used as a modulating device for modulating light beams emitted from the polarizing illumination device according to display information.

Figure 11:
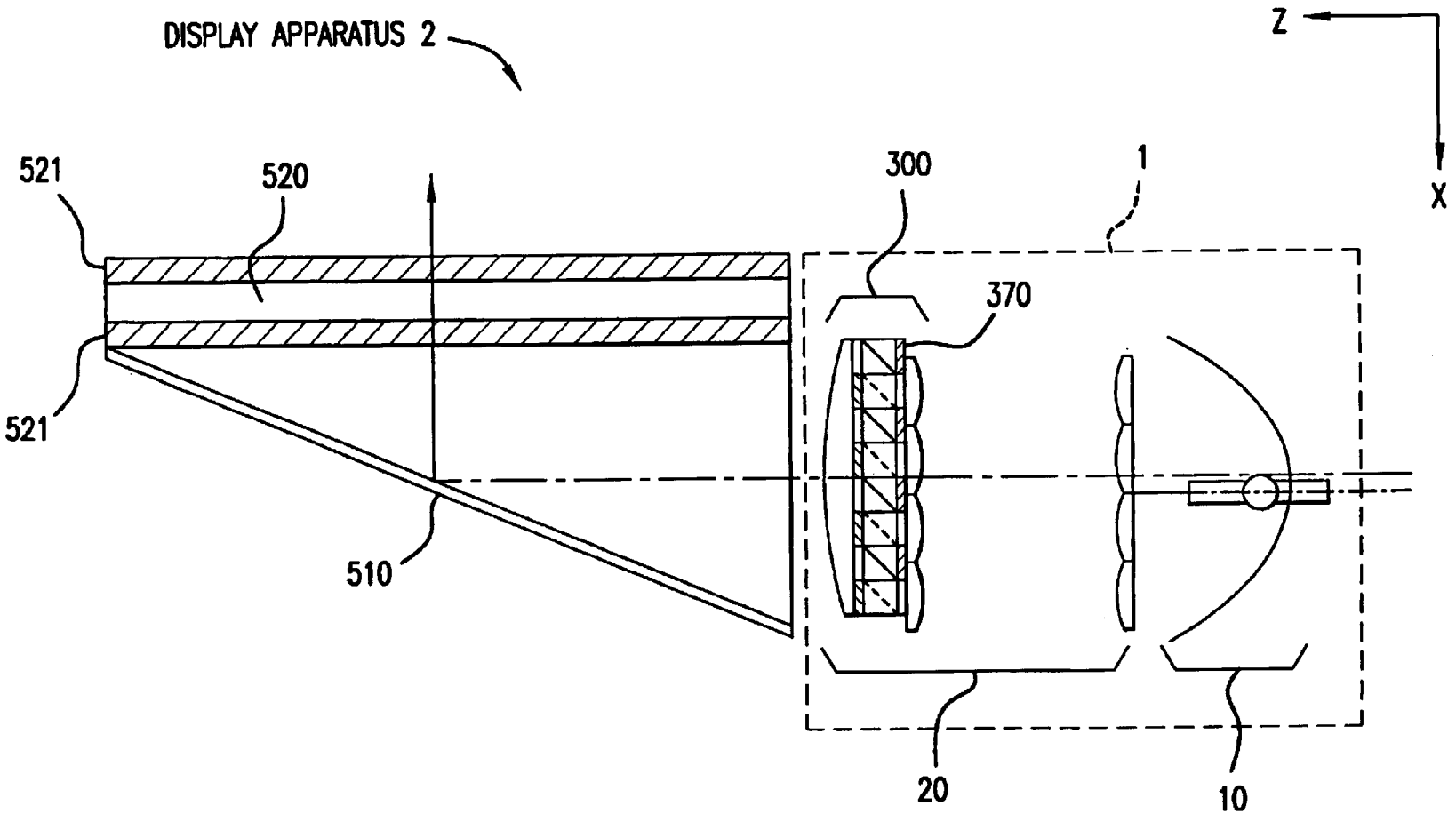
FIG. 11 is a schematic structural view showing the principal part of an optical system in a display apparatus according to a second embodiment of the present invention, in which the polarizing illumination device shown in FIG. 1 is incorporated.

FIG. 11 is a schematic structural view showing the principal part of an optical system of a display apparatus 2 according to this embodiment, and shows the sectional structure in the XZ plane. The display apparatus 2 of this embodiment roughly comprises the polarizing illumination device 1 shown described in the first embodiment, a reflecting mirror 510, and a liquid crystal device 520.

The polarizing illumination device 1 has a light source section 10 for emitting randomly polarized beams in one direction, and the randomly polarized beams emitted from the light source section 10 are converted into substantially the same type of polarized beams by a polarized light generating device 20. The reflecting mirror 510 turns the light traveling direction of the polarized beams emitted from the polarizing illumination device 1 by about 90°. The liquid crystal device 520 is illuminated with substantially the same type of polarized beams. Polarizing plates 521 are placed in front of and behind the liquid crystal device 520. A light diffusing plate (not shown) maybe placed before the liquid crystal device 520 (on the side of the reflecting mirror 510) for the purpose of improving the angle of view.

The display apparatus 2 having such a structure employs a liquid crystal device for modulating the same type of polarized beams. Therefore, if randomly polarized beams are directed to the liquid crystal device by using a conventional illumination device, about half the randomly polarized beams are absorbed by the polarizing plates 521 and turned into heat, whereby the light use efficiency is low. The display apparatus 2 of this embodiment, however, substantially improves such a problem.

In the polarizing illumination device 1 of the display apparatus 2 according to this embodiment, only one type of polarized beams, for example, P polarized beams, are subjected to a rotary polarization action by the $\lambda/2$ phase plate, and the polarization direction thereof is made identical with that of the other type of polarized beams, for example, S polarized beams. Since substantially the same type of polarized beams, which are polarized in the same direction, are directed to the liquid crystal device 520, the amount of light to be absorbed by the polarizing plates 521 is extremely small, which makes it possible to enhance the use efficiency of the source light, and to thereby obtain a bright display state.

Particularly, in the polarizing illumination device 1 used as an illumination device, since the shading plate 370 is placed inside the second optical element 300, other polarized beams which are unnecessary for display on the liquid crystal device rarely mix into the illumination light emitted from the polarizing illumination device 1. As a result, the amount of light absorbed by the polarizing plate 521 placed on the light incident side of the liquid crystals device 520 is extremely small, and therefore, the amount of heat generated in light absorption is extremely small. Consequently, it is possible to omit a cooling device for minimizing the increase in temperature of the polarizing plate 521 and the liquid crystal device 520, or to substantially reduce the size of the cooling device even if such omission is impossible.

Third Embodiment

A description will be given of a first example of a [projection display apparatus] *projector* in which the polarization illumination device 1 described in the first embodiment is incorporated. In this embodiment, a transmission-type liquid crystal device is used as a modulating device for modulating light beams emitted from the polarizing illumination device according to display information.

Figure 12:
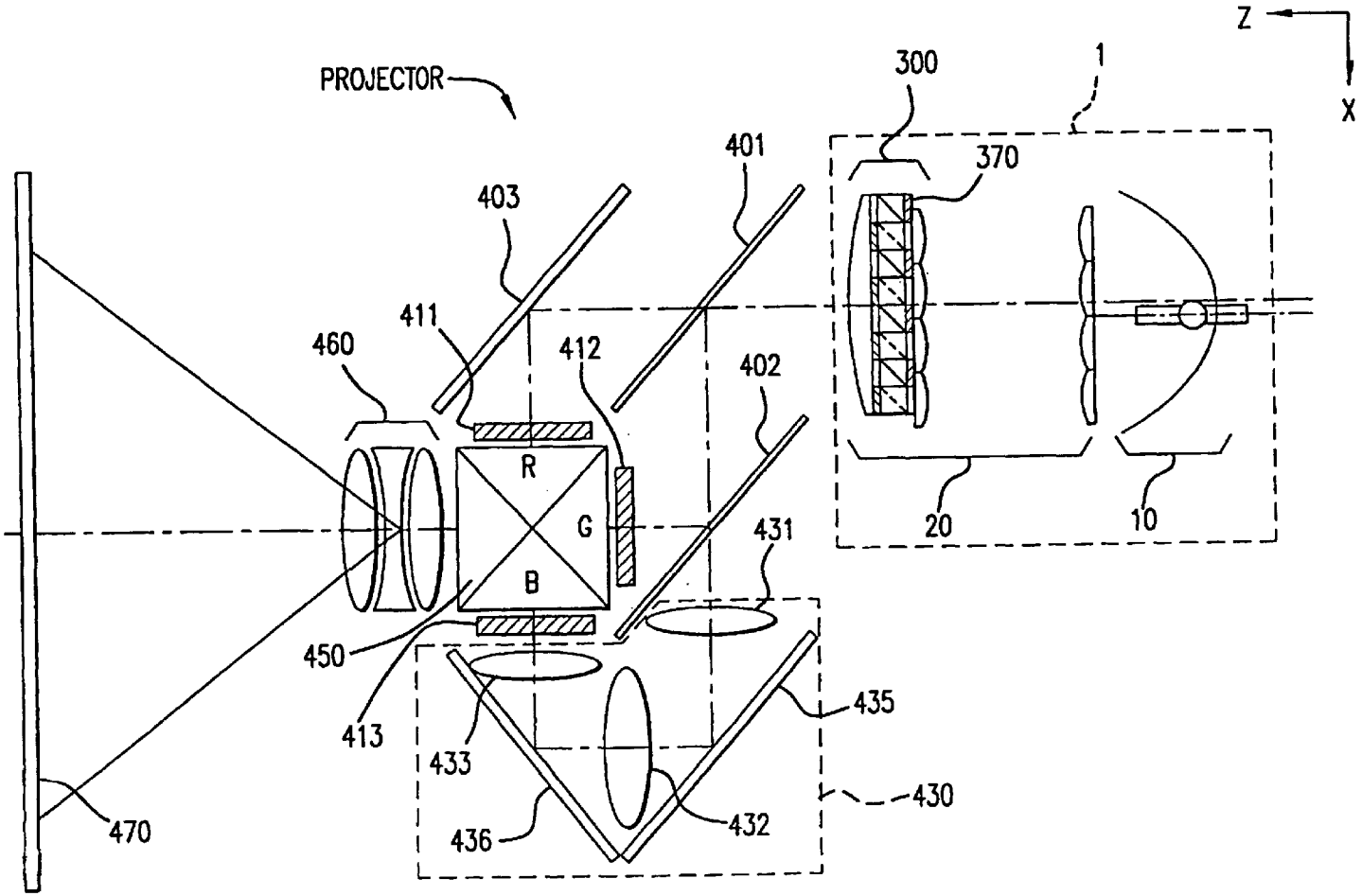
FIG. 12 is a schematic structural view showing the principal part of an optical system in a [projection display apparatus] *projector* according to a third embodiment of the present invention, in which the polarizing illumination device shown in FIG. 1 is incorporated.

FIG. 12 is a schematic structural view showing the principal part of an optical system of a [projection display apparatus] *projector* 3 according to this embodiment, and shows the sectional structure in the XZ plane. The [projection display apparatus] *projector* 3 of this embodiment generally comprises the polarizing illumination device 1 described in the first embodiment, a colored light separating means for separating a white light beam into three colored lights, three transmission-type liquid crystal devices for modulating the colored lights according to display information and thereby forming display images, a colored light synthesizing means for forming a color image by synthesizing the three colored lights, and a projection optical system for projecting and displaying the color image.

The polarizing illumination device 1 of this embodiment has a light source section 10 for emitting randomly polarized beams in one direction, and the randomly polarized beams emitted from the light source section 10 are converted into substantially the same type of polarized beams by a polarized light generating device 20.

First, the red light of the light emitted from the polarizing illumination device 1 transmits through a blue-green reflecting dichroic mirror 401 serving as the colored light separating means, and the blue light and the green light are reflected. The red light is reflected by a reflecting mirror 403 and reaches a liquid crystal device 411 for red light. On the other hand, the green light of the blue and green lights is reflected by a green reflecting dichroic mirror 402 that also serves as the colored light separating means, and reaches a liquid crystal device 412 for green light.

Since the blue light has the longest optical path of the colored lights, a light guide means 430 formed of a relay lens system comprising an incident lens 431, a relay lens 432, and an emergent lens 433 is provided for the blue light. That is, after transmitting through the green reflecting dichroic mirror 402 and the incident lens 431, the blue light is first reflected by a reflecting mirror 435, and directed to and focused onto the relay lens 432. After being focused onto the relay lens, the blue light is directed to the emergent lens 433 by a reflecting mirror 436, and then, reaches a liquid crystal device 413 for blue light. The liquid crystal devices 411, 412, and 413 located at three positions respectively modulate the colored lights so that the colored lights contain corresponding image information, and make the modulated colored lights enter a crossed dichroic prism 450 serving as the colored light synthesizing means. The crossed dichroic prism 450 includes a dielectric multilayer film for reflecting red light and a dielectric multilayer film for reflecting blue light which are crossed in the form of X, and synthesizing the modulated light beams, thereby forming a color image. The color image formed therein is enlarged and projected onto a screen 470 by a projection lens 460 serving as the projection optical system, so that a projection image is formed.

The [projection display apparatus] *projector* 3 having such a structure employs the liquid crystal devices each for modulating one type of polarized beam. Therefore, if randomly polarized beams are directed to the liquid crystal device by using a conventional illumination device, about half of them are absorbed by a polarizing plate (not shown) and turned into heat. Therefore, the light use efficiency is low, and there is a need for a large and noisy cooling device for minimizing heat generation of the polarizing plate. The [projection display apparatus] *projector* 3 of this embodiment, however, substantially improves such problems.

In the polarizing illumination device 1 of the [projection display apparatus] *projector* 3 according to this embodiment, only one type of polarized beam, for example, a P polarized beam is subjected to the rotary polarization action by a $\lambda/2$ phase plate, and the polarization direction thereof is made identical with that of the other type of polarized beam, for example, and S polarized beam. Since substantially the same type of polarized beams, which are polarized in the same direction, are directed to the liquid crystal devices 411, 412, and 413 located at three position, the amount of light to be absorbed by the polarizing plate is extremely small, which makes it possible to enhance the light use efficiency, and to thereby obtain a bright projection image.

Particularly, in the polarizing illumination device 1 used as an illumination device, since the shading plate 370 is placed inside the second optical element 300, other polarized beams which are unnecessary for display on the liquid crystal device rarely mix into the illumination light emitted from the polarizing illumination device 1. As a result, the amount of light absorbed by polarizing plates (not shown) respectively placed on the light incident sides of the liquid crystal devices 411, 412, and 413 located at three positions is extremely small, and therefore, the amount of heat generated in light absorption is extremely small. Consequently, it is possible to substantially reduce the size of a cooling device for minimizing the increase in temperature of the polarizing plates and the liquid crystal devices. As mentioned above, a small cooling device will do for a [projection display apparatus] *projector* capable of displaying a considerably bright projection image with a considerably high-power light source lamp, which makes it possible to reduce noise of the cooling device, and to thereby achieve a quiet and high-performance [projection display apparatus]*projector*.

Furthermore, the polarizing illumination device 1 spatially separates two types of polarized beams in the lateral direction (the X direction) by the second optical element 300. Therefore, the polarizing illumination device 1 does not waste the light, and is convenient for illuminating a liquid crystal device shaped like a laterally extended rectangle.

As described in connection with the above described first embodiment, the widening of light beams emitted from the polarizing separation unit array 320 is restricted although the polarizing illumination device 1 of this embodiment incorporates polarizing conversion optical elements therein. This means that minimal light enters the liquid crystal device at a large angle in illuminating the liquid crystal device. Accordingly, it is possible to achieve a bright projection image without using a projection lens system having a small F-number and an extremely large aperture, and to thereby achieve a compact [projection display apparatus] *projector*.

Since the crossed dichroic prism 450 is used as the colored light synthesizing means in this embodiment, it is possible to reduce the size of the apparatus. Furthermore, since the optical paths between the liquid crystal devices 411, 412, and 413, and the projection lens system are short, even if the projection lens system has a relatively small aperture, it is possible to achieve a bright projection image. Still furthermore, though only one of the three optical paths of the colored lights is difficult in length from the others, since the light guide means 430 formed of a relay lens system comprising the incident lens 431, the relay lens 432, and the emergent lens 433 is provided for the blue light having the longest optical path, no color inconsistency arises.

The [projection display apparatus] *projector* may comprise a mirror optical system using two dichroic mirrors as the colored light synthesizing means. Of course, it is also possible in that case to incorporate the polarizing illumination device of this embodiment, and to form a high-quality bright projection image having a high light use efficiency, similarly to this embodiment.

Fourth Embodiment

Another embodiment of a [projection display apparatus] *projector* in which the polarizing illumination device 1 described in the first embodiment is incorporated will be described. In this embodiment, reflection-type liquid crystal devices are used as modulating devices for modulating light beams emitted from the polarizing illumination device according to display information.

Figure 13:
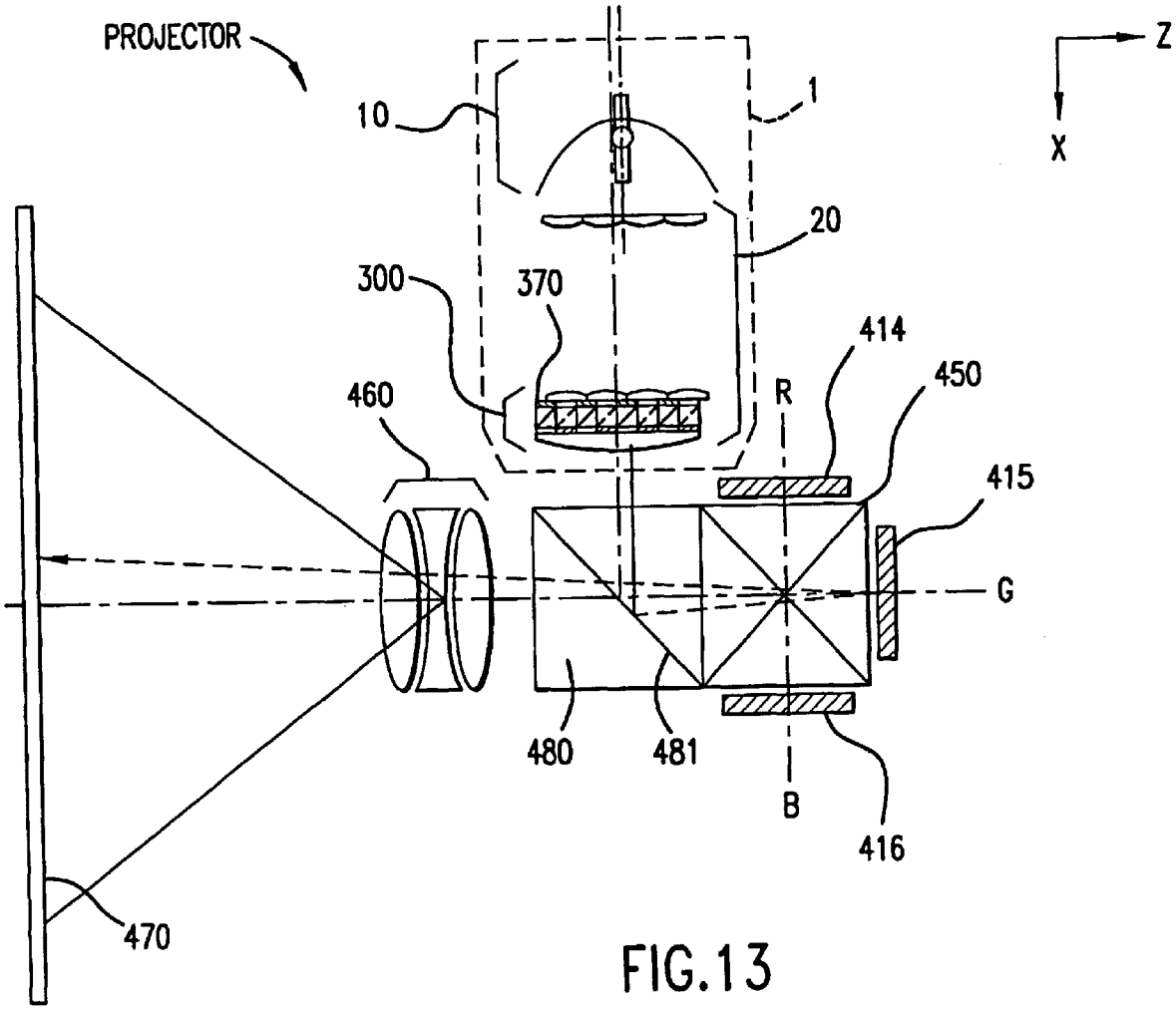
FIG. 13 is a schematic structural view showing the principal part of an optical system in a [projection display apparatus] *projector* according to a fourth embodiment of the present invention, in which the polarizing illumination device shown in FIG. 1 is incorporated.

FIG. 13 is a schematic structural plan view of the principal part of an optical system in a [projection display apparatus] *projector* 4 of this embodiment. The [projection display apparatus] *projector* 4 of this embodiment generally comprises the polarizing illumination device 1 of the first embodiment, a polarizing beam splitter 480, a crossed dichroic prism 450 doubling as the colored light separation means and the colored light synthesizing means, three reflection-type liquid crystal devices 414, 415, and 416 serving as modulating devices, and a projection lens 460 serving as the projection optical system.

The polarizing illumination device 1 has a light source section 10 for emitting randomly polarized beams in one direction, and the randomly polarized beams emitted from the light source section 10 are converted into substantially the same type of polarized beams (S polarized beams in this embodiment) by a polarized light generating device 20.

The light beams emitted from the polarizing illumination device 1 enter into the polarizing beam splitter 480, and are reflected by a polarizing separation plane 418. Then, the traveling direction of the light beams is changed by approximately 90°. Then, the light beams enter the adjoining crossed dichroic prism 450. Although most of the light beams emitted from the polarizing illumination device 1 are S polarized beams, a few polarized beams polarized in a different direction from the S polarized beams (P polarized beams in this embodiment) sometimes mix, and the light beams polarized in the different direction (the P polarized beams) transmit through the polarizing separation plane 481 unchanged, and are emitted from the polarizing beam splitter 480 (these P polarized beams do not serve as illumination light for illuminating the liquid crystal devices.)

The S polarized beams that are incident on the crossed dichroic prism 450 are separated into three light beams of red, green, and blue by the crossed dichroic prism 450 in accordance with the wavelength, and the light beams respectively reach the reflection liquid crystal device 414 for red light, the reflection liquid crystal device 415 for green light, and the reflection liquid crystal device 416 for blue light, thereby illuminating the liquid crystal devices. That is, the crossed dichroic prism 450 acts as the colored light separation means for illumination light for illuminating the liquid crystal devices.

The liquid crystal devices 414, 415, and 416 used in this embodiment are of the reflection-type. They modulate respective colored lights, and provide the colored lights with corresponding external display information. At the same time, they respectively change the polarization directions of the light beams emitted from the liquid crystal devices, and almost reverse the direction of travel of the light beams. Therefore, the light beams respectively reflected from the liquid crystal devices are partially brought to a P polarized state according to display information, and then emitted. The modulated light beams emitted from the liquid crystal devices 414, 415, and 416 (mainly P polarized beams) enter the crossed dichroic prism 450 again, are synthesized into one optical image, and enter the adjoining polarizing beam splitter 480 again. That is, the crossed dichroic prism 450 acts as the colored light synthesizing means for the modulated light beams emitted from the liquid crystal devices.

Since the light beams modulated by the liquid crystal devices 414, 415, and 416 of the light beams that are incident on the polarizing beam splitter 480 are P polarized beams, they transmit through the polarizing separation plane 481 of the polarizing beam splitter 480 unchanged, and form an image on a screen 470 through the projection lens 460.

The [projection display apparatus] *projector* 4 having such a structure also employs liquid crystal devices that each modulate one type of polarized beam, similarly to the above described [projection display apparatus] *projector* 3. Therefore, when a conventional illumination device for using randomly polarized beams as illumination light is employed, light beams separated by the polarizing beam splitter 480 and directed to the reflection-type liquid crystal devices are reduced to approximately half the number of the randomly polarized beams, the light use efficiency is low and a bright projection image is difficult to obtain. In the [projection display apparatus] *projector* 4 of this embodiment, however, such a problem is substantially improved.

That is, the [projection display apparatus] *projector* 4 of this embodiment can efficiently generate substantially the same type of polarized beams, they are polarized in the same direction, by using the polarizing illumination device 1 of the present invention instead of the conventional illumination device, and therefore, almost all light beams that are incident on the polarizing beam splitter 480 are directed as illumination light beams to the reflection-type liquid crystal devices 414, 415, and 416 located at three positions. As a result, it is possible to obtain a bright projection image that is uniform in brightness and color.

Particularly, in the polarizing illumination device 1 used as an illumination device, since the shading plate 370 is placed inside the second optical element 300, other polarized beams that are unnecessary for display on the liquid crystal apparatus hardly mix into the illumination light emitted from the polarizing illumination device 1. Therefore, it is possible to obtain high-quality illumination light beams polarized in the same direction, and to thereby succeed in obtaining a high-quality bright projection image.

Moreover, the second optical element 300 in the polarizing illumination device 1 spatially separates two types of polarized beams in the lateral direction (the X direction). Therefore, the polarizing illumination device 1 does not waste the light and is convenient for illuminating a liquid crystal device shaped like a laterally extended rectangle.

As described in connection with the above described first embodiment, the widening of light beams emitted from the polarizing separation unit array 320 is restricted although the polarizing illumination device 1 of this embodiment incorporates polarizing conversion optical elements therein. This means that minimal light enters the liquid crystal device at a large angle in illuminating the liquid crystal device. Accordingly, it is possible to achieve a bright projection image without using a projection lens system having a small F-number and an extremely large aperture, and to thereby achieve a compact [projection display apparatus]*projector* .

Figure 14:
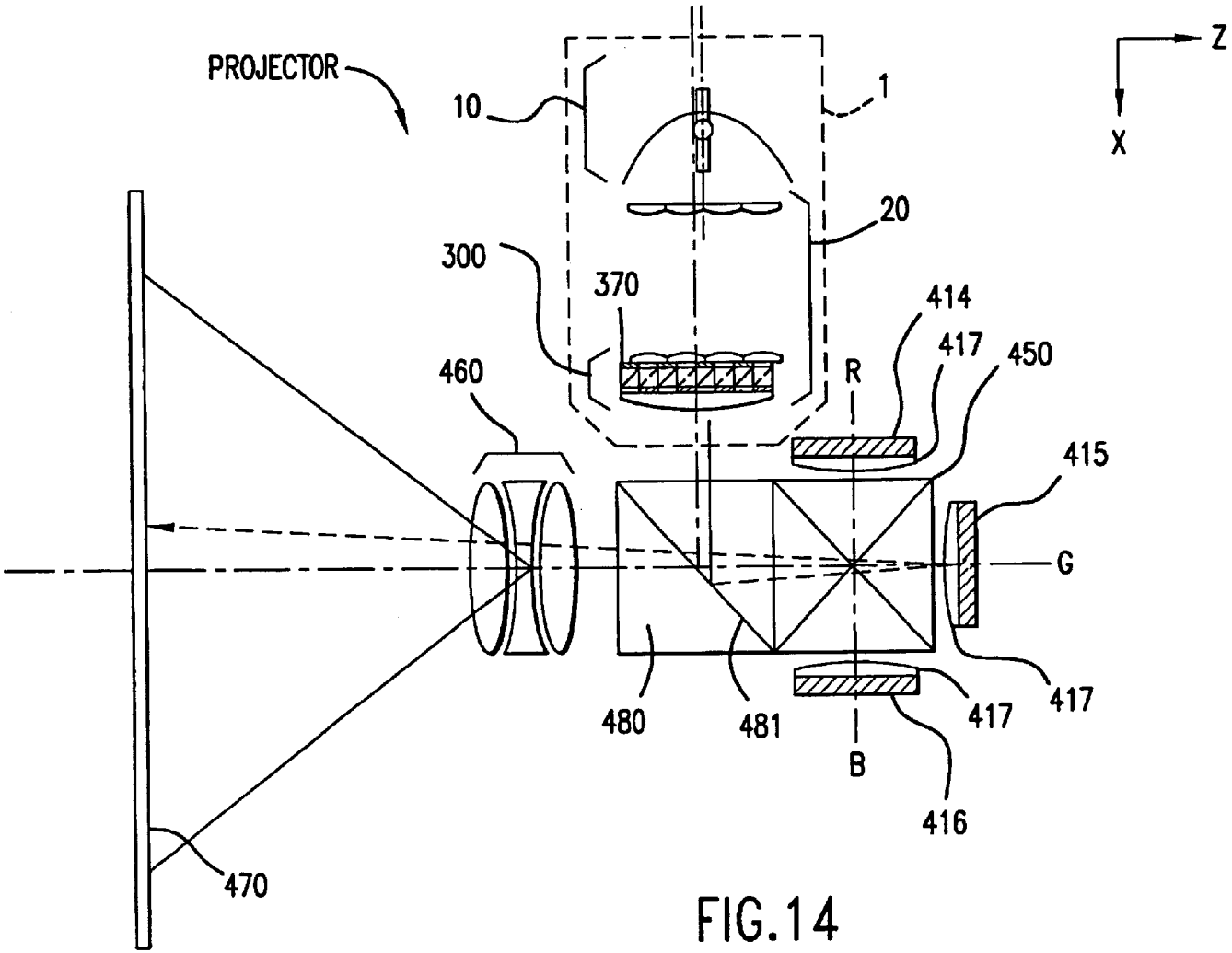
FIG. 14 is a schematic structural view showing the principal part of an optical system in a modification of the [projection display apparatus] *projector* according to the fourth embodiment of the present invention, in which the polarizing illumination device shown in FIG. 1 is incorporated.
Figure 15:
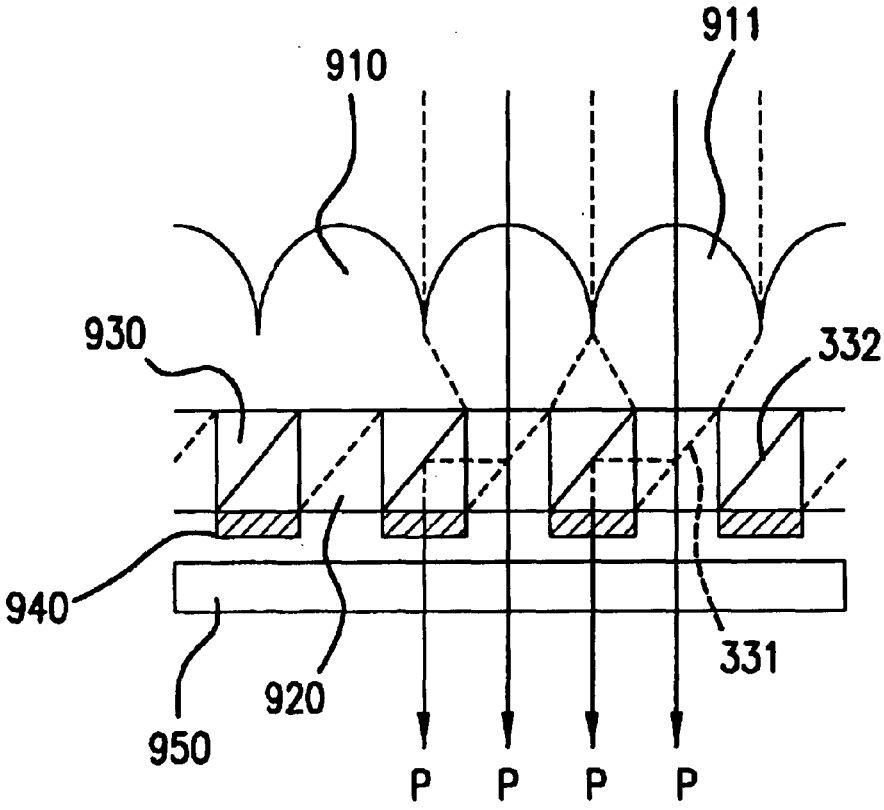
FIG. 15 is a schematic structural view of a polarizing optical system disclosed in Japanese Unexamined Patent Publication No. 7-294906.

Condenser lenses 417 may be respectively interposed between the crossed dichroic prism 450 and the liquid crystal devices 414, 415, and 416 located at three positions in the [projection display apparatus] *projector* 4 of this embodiment. FIG. 14 shows a schematic structure of an optical system in that situation. Since such placement of these condenser lenses allows illumination light beams from the polarizing illumination device 1 to be directed to the liquid crystal devices while restricting the widening of the light beams, it is possible to further improve the efficiency in illuminating the liquid crystal devices, and the incident efficiency in making light beams reflected by the liquid crystal devices enter the projection lens 460. From the viewpoint of reduction of light losses at the lens interfaces, it is preferable to place each condenser lens integrally with the liquid crystal device as shown in FIG. 14, or with the crossed dichroic prism.

Although S polarized beams are used as illumination light in the [projection display apparatus] *projector* 4 of this embodiment. P polarized beams may be used as illumination light. In this case, the polarizing illumination device 1 and the crossed dichroic prism 450 are placed opposed to each other through the polarizing beam splitter 480.

Furthermore, though the crossed dichroic prism is used as the colored light separation means and the colored light synthesizing means in the embodiment, the [projection display apparatus] *projector* may comprise two dichroic mirrors instead. Of course, it is also possible in that case to incorporate the polarizing illumination device of this embodiment, and to form a high-quality bright projection image having a high light use efficiency, similarly to this embodiment.

As described above, according to the present invention, it is possible to achieve a polarizing conversion device and a polarizing illumination device capable of generating with high efficiency only the same type of polarized beams that have a more uniform light intensity distribution in a illumination region than incident light beams, and, at the same, that are polarized in the same direction. Furthermore, it is possible to easily achieve a display apparatus and a [projection display apparatus] *projector* capable of displaying a high-quality bright image through the use of the polarizing conversion device and the polarizing illumination device of the present invention.

We claim:

1. A polarizing conversion device, comprising:

a polarizing separation element having a light incident side, a light emergent side, a polarizing separation plane that separate P and S polarized beams by transmitting one of the P and S polarized beams therethrough toward the light emergent side of the polarizing separation element and reflecting the other of the P and S polarized beams, and a reflecting plane disposed substantially parallel with said polarizing separation plane that reflects the other of the P and S polarized beams reflected by said polarizing separation plane toward the light emergent side of the polarizing separation element;

a selective phase plate disposed at the light emergent side of said polarizing separation element that aligns a polarization direction of one of the P and S polarized beams separated by said polarizing separation element with a polarization direction of the other of the P and S polarized beams, and a device for preventing light from directly entering said reflecting plane disposed at the light incident side of said polarizing separation element.

2. The polarizing conversion device according to claim 1, wherein the device for preventing light from directly entering said reflective plane includes at least one of a shading device and an optical attenuating device.

3. The polarizing conversion device according to claim 2, wherein said shading device is a reflecting plate.

4. The polarizing conversion device according to claim 2, wherein said shading device is a reflecting film, and said reflecting film is formed on a light incident surface of the light incident side of said polarizing separation element.

5. The polarizing conversion device according to claim 2, wherein said optical attenuating device is a light diffusing plate.

6. The polarizing conversion device according to claim 2, wherein said optical attenuating device is a light diffusing surface formed on a light incident surface of the light incident side of said polarizing separation element.

7. The polarizing conversion device according to claim 1, wherein said device for preventing light from directly entering said reflecting plane and said polarizing separation element are integrated with each other.

8. A polarizing illumination device, comprising:

a light source that emits a light beam;

a first optical element that separates the light beam emitted from said light source into a plurality of intermediate beams that converge at a converging position; and a second optical element disposed at or near the converging position, the second optical element including:

[a condenser lens array that includes a plurality of condenser lenses that respectively condense the intermediate beams;]

a polarizing separation element that spatially separates each of the intermediate beams into an S polarized beam and a P polarized beam, the polarizing separation element including a light incident side, a light emergent side, a polarizing separation plane that separates P and S polarized beams by transmitting one of the P and S polarized beams therethrough toward the light emergent side of the polarizing separation element and reflecting the other of the P and S polarized beams, and a reflecting plane disposed substantially parallel with said polarizing separation plane that reflects the other of the P and S polarized beams reflected by said polarizing separation plane toward the light emergent side of the polarizing separation element;

a selective phase plate that aligns a polarization direction of one of the P and S polarized beams is separated by said polarizing separation element with a polarization direction of the other of the P and S polarized beams;

a superimposing lens that superimposes the polarized beams; and a device for preventing each of the intermediate beams from directly entering said reflecting plane interposed between said first optical element and said polarizing separation element.

9. The polarizing illumination device according to claim 8, wherein the device for preventing each of the intermediate beams from directly entering said reflecting plane includes at least one of a shading device and an optical attenuating device.

10. The polarizing illumination device according to claim 9, wherein said shading device is a reflecting plate.

11. The polarizing illumination device according to claim 9, wherein said shading device is a reflecting film and said reflecting film is formed on a light incident surface of the light incident side of said polarizing separation element.

12. The polarizing illumination device according to claim [9]*47*, wherein said shading device is a reflecting film and said reflecting film is formed on a light emergent surface of said condenser lens array.

13. The polarizing illumination device according to claim 9, wherein said optical attenuating device is a light diffusing plate.

14. The polarizing illumination device according to claim 9, wherein said optical attenuating device is a light diffusing surface formed on a light incident surface of the light incident side of said polarizing separation element.

15. The polarizing illumination device according to claim [9]*47*, wherein said optical attenuating device is a light diffusing surface formed on a light emergent surface of said condenser lens array.

16. The polarizing illumination device according to claim 8, wherein said device for preventing each of the intermediate beams from directly entering said reflecting plane is integrated with said polarizing separation element.

17. The polarizing illumination device according to claim [8]*46*, wherein said device for preventing each of the intermediate beams from directly entering said reflecting plane is integrated with said condenser lens array.

18. A display apparatus, comprising:

a light source that emits a light beam;

a first optical element that separates the light beam emitted from said light source into a plurality of intermediate beams that converge at a converging position;

a second optical element disposed at or near the converging position, the second optical element including:

[a condenser lens array that includes a plurality of condenser lenses that respectively condense the intermediate beams;]

a polarizing separation element that spatially separates each of the intermediate beams into an S polarized beam and a P polarized beam, the polarizing separation element including a light incident side, a light emergent side, a polarizing separation plane that separates P and S polarized beams by transmitting one of the P and S polarized beams therethrough toward the light emergent side of the polarizing separation element and reflecting the other of the P and S polarized beams, and a reflecting plane disposed substantially parallel with said polarizing separation plane that reflects the other of the P and S polarized beams reflected by said polarizing separation plane toward the light emergent side of the polarizing separation element;

a selective phase plate that aligns a polarization direction of one of the P and S polarized beams separated by said polarizing separation element with a polarization direction of the other of the P and S polarized beams, a superimposing lens that superimposes the polarized beams; and a device for preventing each of the intermediate beams from directly entering said reflecting plane interposed between said first optical element and said polarizing separation element; and a modulating device for modulating a light beam emitted from said second optical element.

19. A [projection display apparatus] *projector*, comprising:

a light source that emits a light beam;

a first optical element that separates the light beam emitted from said light source into a plurality of intermediate beams that converge at a converging position a second optical element disposed at or near the converging position, the second optical element including:

[a condenser lens array that indicates a plurality of condenser lenses that respectively condense the intermediate beams;]

a polarizing separation element that spatially separates each of the intermediate beams into an S polarized beam and a P polarized beam, the polarizing separation element including a light incident side, a light emergent side, a polarizing separation plane that separates P and S polarized beams by transmitting one of the P and S polarized beams therethrough toward the light emergent side of the polarizing separation element and reflecting the other of the P and S polarized beams, and a reflecting plane disposed substantially parallel with said polarizing separation plane that reflects the other of the P and S polarized beams reflected by said polarizing separation plane toward the light emergent side of the polarizing separation element;

a selective phase plate that aligns a polarization direction of one of the P and S polarized beams separated by said polarizing separation element with a polarization direction of the other of the P and S polarized beams;

a superimposing lens that superimposes the polarized beams; and a device for preventing each of the intermediate beams from directly entering said reflecting plane interposed between said and first optical element and said polarizing separation element;

at least one modulating device for modulating a light beam emitted from said second optical element according to display information; and a projection optical system for projecting the light beam modulated by said modulating device onto a projection plane.

20. The [projection display apparatus] *projector* according to claim 19, further comprising:

color light separation system for separating the light beam into a plurality of colored lights;

a plurality of said modulating devices for respectively modulating the colored lights; and colored light synthesizing system for synthesizing the colored lights modulated by said plurality of modulating devices;

wherein a synthesized beam synthesized by said colored light synthesizing system is projected onto said projection plane through said projection optical system.

21. The [projection display apparatus]*projector* according to claim 19, wherein said at least one modulating device is a reflection-type device.

22. A method of converting randomly polarized beams into substantially one type of polarized beams, comprising the steps of:

separating P and S polarized beams with a polarizing separation element by transmitting one of the P and S polarized beams through a separation plane of the polarizing separation element toward a light emergent side of the polarizing separation element, reflecting the other of the P and S polarized beams with the separation plane, and reflecting the other of the P and S polarized beams reflected with the separation plane toward the light emergent side of the polarizing separation element with a reflecting plane that is disposed substantially parallel with the polarizing separation plane;

aligning a polarization direction of one of the P and S polarized beams separated by the polarizing separation element with a polarization direction of the other of the P and S polarized beams with a selective phase plate disposed at the light emergent side of the polarizing separation element; and preventing light from directly entering the reflecting plane with at least one of a shading device and an optical attenuating device.

23. The method according to claim 22, wherein light is prevented from directly entering the reflecting plane with a reflecting plate.

24. The method according to claim 22, wherein light is prevented from directly entering the reflecting plane with a reflecting film that is formed on a light incident surface of a light incident side of the polarizing separation element.

25. The method according to claim 22, wherein light is prevented from directly entering the reflecting plane with a light diffusing plate.

26. The method according to claim 22, wherein light is prevented from directly entering the reflecting plane with a light diffusing surface formed on a light incident surface of a light incident side of the polarizing separation element.

27. A polarizing conversion device, comprising:

means for separating P and S polarized beams, including a separation plane, a reflecting plane, a light incident side and a light emergent side, by transmitting one of the P and S polarized beams through the separation plane toward the light emergent side, reflecting the other of the P and S polarized beams with the separation plane, and reflecting the other of the P and S polarized beams reflected with the separation plane toward the light emergent side with the reflecting plane;

means for aligning a polarization direction of one of the P and S polarized beams separated by the means for separating with a polarization direction of the other of the P and S polarized beams; and means for preventing light from directly entering the reflecting plane.

*28. The display apparatus according to claim 18, wherein the device for preventing each of the intermediate beams from directly entering said reflecting plane includes at least one of a shading device and an optical attenuating device.*

*29. The display apparatus according to claim 28, wherein said shading device is a reflecting plate.*

*30. The display apparatus according to claim 28, wherein said shading device is a reflecting film and said reflecting film is formed on a light incident surface of the light incident side of said polarazing separation element.*

*31. The display according to claim 50, wherein said shading device is a reflecting film and said reflecting film is formed on a light emergent surface of said condenser lens array.*

*32. The display apparatus to claim 28, wherein said optical attenuating device is a light diffusing plate.*

*33. The display apparatus according to claim 28, wherein said optical attenuating device is a light diffusing surface formed on a light incident surface of the light incident side of said polarizing separation element.*

*34. The display apparatus according to claim 50, wherein said optical attenuating device is a light diffusing surface formed on a light emergent surface of said condenser lens array.*

*35. The display apparatus according to claim 18, wherein said device for preventing each of the intermediate beams from directly entering said reflecting plane is intergrated with said polarizing separation element.*

*36. The display apparatus according to claim 49, wherein said device for preventing each of the intermediate beams from directly entering said reflecting plane is integrated with said condenser lens array.*

*37. The projector according to claim 19, wherein the device for preventing each of the intermediate beams from directly entering said reflecting plane includes at least one of a shading device and an optical attenuating device.*

*38. The projector according to claim 37, wherein said shading device is a reflecting plate.*

*39. The projector according to claim 37, wherein said shading device is a reflecting film and said reflecting film is formed on a light incident surface of the light incident side of said polarizing separation element.*

*40. The projector according to claim 53, wherein said shading device is a reflecting film and said reflecting film is formed on a light emergent surface of said condenser lens array.*

*41. The projector according to claim 37, wherein said optical attenuating device is a light diffusing plate.*

*42. The projector according to claim 37, wherein said optical attenuating device is a light diffusing surface formed on a light incident surface of the light incident side of said polarizing separation element.*

*43. The projector according to claim 53, wherein said optical attenuating device is a light diffusing surface formed on a light emergent surface of said condenser lens array.*

*44. The projector according to claim 19, wherein said device for preventing each of the intermediate beams from directly entering said reflecting plane is integrated with said polarizing separation element.*

*45. The projector according to claim 52, wherein said device for preventing each of the intermediate beams from directly entering said reflecting plane is integrated with said condenser lens array.*

*46. The polarizing illumination device according to claim 8, the sencond optical element, further comprising:*

*a condenser lens array that includes a plurality of condenser lenses that respectively condense the intermediate beams.*

*47. The polarizing illumination device according to claim 46, the device to prevent each of the intermediate beams from directly entering said reflecting plane including at least one of a shading device and an optical attenuating device.*

*48. The polarizing illumination device according to claim 8, the superimposing lens being a lens array that includes a plurality of lenses.*

*49. The display apparatus according to claim 18, the second optical element, further comprising:*

*a condenser lens array that includes a plurality of condenser lenses that respectively condense the intermediate beams.*

*50. The display apparatus according to claim 49, the device to prevent each of the intermediate beams from directly entering said reflecting plane including at least one of a shading device and an optical attenuating device.*

*51. The display apparatus according to claim 18, the superimposing lens being a lens array that includes a plurality of lenses.*

*52. The projector according to claim 19, the second optical element, further comprising:*

*a condenser lens array that includes a plurality of condenser lenses that respectively condense the intermediate beams.*

*53. The projector according to claim 52, the device to prevent each of the intermediate beams from directly entering said reflecting plane including at least one of a shading device and an optical attenuating device.*

*54. The projector according to claim 19, the superimposing lens being a lens array that includes a plurality of lenses.*

* * * * *